United States Patent
Iyer et al.

(10) Patent No.: US 11,232,780 B1
(45) Date of Patent: Jan. 25, 2022

(54) PREDICTING PARAMETRIC VOCODER PARAMETERS FROM PROSODIC FEATURES

(71) Applicant: Google LLC, Mountain View, CA (US)

(72) Inventors: Rakesh Iyer, Mountain View, CA (US); Vincent Wan, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/033,783

(22) Filed: Sep. 26, 2020

Related U.S. Application Data

(60) Provisional application No. 63/069,431, filed on Aug. 24, 2020.

(51) Int. Cl.
*G10L 13/027* (2013.01)
*G10L 13/10* (2013.01)

(52) U.S. Cl.
CPC ............ *G10L 13/027* (2013.01); *G10L 13/10* (2013.01)

(58) Field of Classification Search
CPC ........ G10L 13/08; G10L 13/027; G10L 13/10
See application file for complete search history.

(56) References Cited

U.S. PATENT DOCUMENTS

| | | | |
|---|---|---|---|
| 6,163,769 A * | 12/2000 | Acero | G10L 13/07 704/243 |
| 10,607,598 B1 * | 3/2020 | Larson | G10L 15/063 |
| 2009/0048841 A1 * | 2/2009 | Pollet | G10L 13/07 704/260 |
| 2012/0191457 A1 * | 7/2012 | Minnis | G10L 13/10 704/260 |
| 2014/0052447 A1 * | 2/2014 | Tachibana | G10L 13/10 704/260 |
| 2020/0152194 A1 * | 5/2020 | Jeong | G10L 13/047 |

* cited by examiner

*Primary Examiner* — Huyen X Vo
(74) *Attorney, Agent, or Firm* — Honigman LLP; Brett A. Krueger

(57) ABSTRACT

A method for predicting parametric vocoder parameter includes receiving a text utterance having one or more words, each word having one or more syllables, and each syllable having one or more phonemes. The method also includes receiving, as input to a vocoder model, prosodic features that represent an intended prosody for the text utterance and a linguistic specification. The prosodic features include a duration, pitch contour, and energy contour for the text utterance, while the linguistic specification includes sentence-level linguistic features, word-level linguistic features for each word, syllable-level linguistic features for each syllable, and phoneme-level linguistic features for each phoneme. The method also includes predicting vocoder parameters based on the prosodic features and the linguistic specification. The method also includes providing the predicted vocoder parameters and the prosodic features to a parametric vocoder configured to generate a synthesized speech representation of the text utterance having the intended prosody.

28 Claims, 8 Drawing Sheets

PREDICTING PARAMETRIC VOCODER PARAMETERS FROM PROSODIC FEATURES

CROSS REFERENCE TO RELATED APPLICATIONS

This U.S. patent application claims priority under 35 U.S.C. § 119(e) to U.S. Provisional Application 63/069,431, filed on Aug. 24, 2020. The disclosure of this prior application is considered part of the disclosure of this application and is hereby incorporated by reference in its entirety.

TECHNICAL FIELD

This disclosure relates predicting parametric vocoder parameters from prosodic features.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional concatenative and parametric synthesis models are capable of providing intelligible speech and recent advances in neural modeling of speech have significantly improved the naturalness of synthesized speech, most existing TTS models are ineffective at modeling prosody, thereby causing synthesized speech used by important applications to lack expressiveness. For instance, it is desirable for applications such as conversational assistants and long-form readers to produce realistic speech by imputing prosody features not conveyed in textual input, such as intonation, stress, and rhythm and style. For example, a simple statement can be spoken in many different ways depending on whether the statement is a question, an answer to a question, there is uncertainty in the statement, or to convey any other meaning about the environment or context which is unspecified by the input text.

Recently, variational autoencoders have been developed to predict prosodic features of duration, pitch contour, and energy contour for effectively modeling prosody of synthesized speech. While these predicted prosodic features are sufficient for driving large neural network-based acoustic models that operate on linguistic and prosodic features, such as WaveNet or WaveRNN models, these predicted prosodic features are insufficient for driving parametric vocoders which require many additional vocoder parameters.

SUMMARY

One aspect of the disclosure provides a method for predicting parametric vocoder parameters from prosodic features. The method includes receiving, at data processing hardware, a text utterance having one or more words, each word having one or more syllables, and each syllable having one or more phonemes. The method also includes receiving, at the data processing hardware, as input to a vocoder model, prosodic features output from a prosody model that represent an intended prosody for the text utterance and a linguistic specification of the text utterance. The prosodic features include a duration, pitch contour, and energy contour for the text utterance, while the linguistic specification of the text utterance includes sentence-level linguistic features for the text utterance, word-level linguistic features for each word of the text utterance, syllable-level linguistic features for each syllable of the text utterance, and phoneme-level linguistic features for each phoneme of the text utterance. The method also includes predicting, by the data processing hardware, as output from the vocoder model, vocoder parameters based on the prosodic features output from the prosody model and the linguistic specification of the text utterance. The method also includes providing, by the data processing hardware, the predicted vocoder parameters output from the vocoder model and the prosodic features output from the prosody model to a parametric vocoder. The parametric vocoder is configured to generate a synthesized speech representation of the text utterance and having the intended prosody.

Implementations of the disclosure may include one or more of the following optional features. In some implementations, the method further includes, receiving, at the data processing hardware, as input to the vocoder model, linguistic feature alignment activations for the linguistic specification of the text utterance. In these implementations, predicting the vocoder parameters is further based on the linguistic feature alignment activations for the linguistic specification of the text utterance. In some examples, the linguistic feature alignment activations include word-level alignment activations and syllable-level alignment activations. The word-level alignment activations each align an activation of each word with the syllable-level linguistic features for each syllable of the word, and the syllable-level alignment activations each align an activation of each syllable with the phoneme-level linguistic features for each phoneme of the syllable. Here, the activation of each word may be based on the word-level linguistic features for the corresponding word and the sentence-level linguistic features for the text utterance. In some examples, the word-level linguistic features include a wordpiece embedding obtained from a sequence of wordpiece embeddings generated by a Bidirectional Encoder Representations from Transformers (BERT) model from the text utterance.

In some implementations, the method further includes, selecting, by the data processing hardware, an utterance embedding for the text utterance, the utterance embedding represents the intended prosody. For each syllable, using the selected utterance embedding, the method includes: predicting, by the data processing hardware, using the prosody model, a duration of the syllable by encoding the phoneme-level linguistic features of each phoneme in the syllable with a corresponding prosodic syllable embedding for the syllable, predicting, by the data processing hardware, a pitch of the syllable based on the predicted duration for the syllable; and generating, by the data processing hardware, a plurality of fixed-length predicted pitch frames based on the predicted duration for the syllable. Each fixed-length pitch frame represents the predicted pitch of the syllable, wherein the prosodic features received as input to the vocoder model include the plurality of fixed-length predicted pitch frames generated for each syllable of the text utterance. In some examples, the method further includes, for each syllable, using the selected utterance embedding predicting, by the data processing hardware, an energy level of each phoneme in the syllable based on the predicted duration for the syllable; and for each phoneme in the syllable, generating, by the data processing hardware, a plurality of fixed-length predicted energy frames based on the predicted duration for the syllable. Each fixed-length predicted energy frame represents the predicted energy level of the corresponding phoneme. Here, the prosodic features received as input to the vocoder model further include the plurality of fixed-length predicted energy frames generated for each phoneme in each syllable of the text utterance.

In some implementations, the prosody model incorporates a hierarchical linguistic structure to represent the text utterance. The hierarchical linguistic structure includes a first level that includes a short-term memory (LSTM) processing cell representing each word of the text utterance, a second level that includes a LSTM processing cell representing each syllable of the text utterance, a third level that includes a LSTM processing cell representing each phoneme of the text utterance, a fourth level that includes a LSTM processing cell representing each fixed-length predicted pitch frame, and a fifth level that includes a LSTM processing cell representing each fixed-length predicted energy frame. The LSTM processing cells of the second level clock relative to and faster than the LSTM processing cells of the first level, the LSTM processing cells of the third level clock relative to and faster than the LSTM processing cells of the second level, the LSTM processing cells of the fourth level clock relative to and faster than the LSTM processing cells of the third level, and the LSTM processing cells of the fifth level clocking at the same speed as the LSTM processing cells of the fourth level and clocking relative to and faster than the LSTM processing cells of the third level. In some implementations, the first level of the hierarchical linguistic structure generates an activation for each word of the text utterance in a single first pass, the second level for the hierarchical linguistic structure generates an activation for each syllable of the text utterance in a single second pass subsequent to the first pass, the third level of the hierarchical linguistic structure generates an activation for each phoneme of the text utterance in a single third pass subsequent to the second pass, the fourth level of the hierarchical linguistic structure generates an activation for each fixed length predicted pitch frame in a single fourth pass subsequent to the third pass, and the fifth level of the hierarchical linguistic structure generates an activation for each fixed-length predicted energy frame in a single fifth pass subsequent to the third pass.

In some examples, the vocoder model incorporates a hierarchical linguistic structure to represent the text utterance. The hierarchical linguistic structure includes a first level including a long short-term memory (LSTM) processing cell representing each word of the text utterance, a second level including a LSTM processing cell representing each syllable of the text utterance, a third level including a LSTM processing cell representing each phoneme of the text utterance, and a fourth level including a LSTM processing cell representing each of a plurality of fixed-length speech frames, the LSTM processing cells of the fourth level clocking relative to and faster than the LSTM processing cells of the third level. The LSTM processing cells of the second level clock relative to and faster than the LSTM processing cells of the first level, the LSTM processing cells of the third level clock relative to and faster than the LSTM processing cells of the second level, and the LSTM processing cells of the fourth level clock relative to and faster than the LSTM processing cells of the third level. In these examples, each of the plurality of fixed-length speech frames may represent a respective portion of the predicted vocoder parameters output from the vocoder model. Additionally, in these examples, the first level of the hierarchical linguistic structure may generate an activation for each word of the text utterance in a single first pass, the second level of the hierarchical linguistic structure may generate an activation for each syllable of the text utterance in a single second pass subsequent to the first pass, the third level of the hierarchical linguistic structure may generate an activation for each phoneme of the text utterance in a single third pass subsequent to the second pass, and the fourth level of the hierarchical linguistic structure may generate an activation for each fixed-length speech frame of the plurality of fixed-length speech frames in a single fourth pass subsequent to the third pass.

The method may further include, receiving, at the data processing hardware, training data including a plurality of reference audio signals and corresponding transcripts. Each reference audio signal includes a spoken utterance of speech and has a corresponding prosody, while each transcript includes a textual representation of the corresponding reference audio signal. For each reference audio signal and corresponding transcript pair, the method may include: obtaining, by the data processing hardware, a reference linguistic specification of the corresponding transcript and reference prosodic features representing the corresponding prosody of the corresponding reference audio signal; and training, by the data processing hardware, using a deep neutral network, the vocoder model to generate, form the reference linguistic specification and the reference prosodic features, a sequence of fixed-length predicted speech frames providing Mel-ceptrum coefficients, aperiodicity components, and voicing components. In some examples, training the vocoder model further includes, for each reference audio signal: sampling, from the corresponding reference audio signal, a sequence of fixed-length reference speech frames providing reference Mel-cepstrum coefficients, reference aperiodicity components, and reference voicing components of the reference audio signal; generating gradients/losses between the sequence of fixed-length predicted speech frames generated by the vocoder model and the sequence of fixed-length reference speech frames sampled from the corresponding reference audio signal; and back-propagating the gradients/losses through the vocoder model.

In some implementations, the method further includes splitting, by the data processing hardware, the predicted vocoder parameters output from the vocoder model into Mel-cepstrum coefficients, aperiodicity components, and voicing components. In these implementations, the method also includes, separately denormalizing, by the data processing hardware, the Mel-cepstrum coefficients, a periodicity components, and voicing components. In these implementations, the method also includes, concatenating, by the data processing hardware, the prosodic features output form the prosody model, the denormalized Mel-cepstrum coefficients, the normalized aperiodicity components, and the denormalized voicing components into a vocoder vector. In these implementations, providing the predicted vocoder parameters output from the vocoder model and the prosodic features output from the prosody model to the parametric vocoder includes providing the vocoder vector to the parametric vocoder as input for generating the synthesized speech representation of the text utterance.

Another aspect of the disclosure provides a system for predicting parametric vocoder parameters from prosodic features. The system includes data processing hardware and memory hardware in communication with the data processing hardware. The memory hardware stores instructions that when executed on the data processing hardware cause the data processing hardware to perform operations. The operations include receiving a text utterance having one or more words, each word having one or more syllables, and each syllable having one or more phonemes. The operations also include receiving, as input to a vocoder model, prosodic features output from a prosody model that represent an intended prosody for the text utterance and a linguistic specification of the text utterance. The prosodic features include a duration, pitch contour, and energy contour for the text utterance, while the linguistic specification of the text utterance includes sentence-level linguistic features for the text utterance, word-level linguistic features for each word of the text utterance, syllable-level linguistic features for each syllable of the text utterance, and phoneme-level linguistic features for each phoneme of the text utterance. The operations also include predicting, as output from the vocoder model, vocoder parameters based on the prosodic features output from the prosody model and the linguistic specification of the text utterance. The operations also include providing the predicted vocoder parameters output from the vocoder model and the prosodic features output from the prosody model to a parametric vocoder. The parametric vocoder is configured to generate a synthesized speech representation of the text utterance and having the intended prosody.

Implementations of the disclosure may include one or more of the following optional features. In some implementations, the operations further include, receiving as input to the vocoder model, linguistic feature alignment activations for the linguistic specification of the text utterance. In these implementations predicting the vocoder parameters is further based on the linguistic feature alignment activations for the linguistic specification of the text utterance. In some examples, the linguistic feature alignment activations include word-level alignment activations and syllable-level alignment activations. The word-level alignment activations each align an activation of each word with the syllable-level linguistic features for each syllable of the word, and the syllable-level alignment activations each align an activation of each syllable with the phoneme-level linguistic features for each phoneme of the syllable. Here, the activation of each word may be based on the word-level linguistic features for the corresponding word and the sentence-level linguistic features for the text utterance. In some examples, the word-level linguistic features include a wordpiece embedding obtained from a sequence of wordpiece embeddings generated by a Bidirectional Encoder Representations from Transformers (BERT) model from the text utterance.

In some implementations, the operations further include selecting an utterance embedding for the text utterance that represents the intended prosody. In these implementations, for each syllable, using the selected utterance embedding, the operations also include: predicting, using the prosody model, a duration of the syllable by encoding the phoneme-level linguistic features of each phoneme in the syllable with a corresponding prosodic syllable embedding for the syllable; predicting a pitch of the syllable based on the predicted duration for the syllable; and generating a plurality of fixed-length predicted pitch frames based on the predicted duration for the syllable. Each fixed-length pitch frame represents the predicted pitch of the syllable, wherein the prosodic features received as input to the vocoder model include the plurality of fixed-length predicted pitch frames generated for each syllable of the text utterance.

In some examples, the operations further include, for each syllable, using the selected utterance embedding: predicting an energy level of each phoneme in the syllable based on the predicted duration for the syllable; and for each phoneme in the syllable, generating a plurality of fixed-length predicted energy frames based on the predicted duration for the syllable. Each fixed-length predicted energy frame represents the predicted energy level of the corresponding phoneme. The prosodic features received as input to the vocoder model further include the plurality of fixed-length predicted energy frames generated for each phoneme in each syllable of the text utterance.

In some implementations, the prosody model incorporates a hierarchical linguistic structure to represent the text utterance. The hierarchical linguistic structure includes a first level that includes a short-term memory (LSTM) processing cell representing each word of the text utterance, a second level that includes a LSTM processing cell representing each syllable of the text utterance, a third level that includes a LSTM processing cell representing each phoneme of the text utterance, a fourth level that includes a LSTM processing cell representing each fixed-length predicted pitch frame, and a fifth level that includes a LSTM processing cell representing each fixed-length predicted energy frame. The LSTM processing cells of the second level clock relative to and faster than the LSTM processing cells of the first level, the LSTM processing cells of the third level clock relative to and faster than the LSTM processing cells of the second level, the LSTM processing cells of the fourth level clock relative to and faster than the LSTM processing cells of the third level, and the LSTM processing cells of the fifth level clocking at the same speed as the LSTM processing cells of the fourth level and clocking relative to and faster than the LSTM processing cells of the third level. In some implementations, the first level of the hierarchical linguistic structure generates an activation for each word of the text utterance in a single first pass, the second level for the hierarchical linguistic structure generates an activation for each syllable of the text utterance in a single second pass subsequent to the first pass, the third level of the hierarchical linguistic structure generates an activation for each phoneme of the text utterance in a single third pass subsequent to the second pass, the fourth level of the hierarchical linguistic structure generates an activation for each fixed length predicted pitch frame in a single fourth pass subsequent to the third pass, and the fifth level of the hierarchical linguistic structure generates an activation for each fixed-length predicted energy frame in a single fifth pass subsequent to the third pass.

In some examples, the vocoder model incorporates a hierarchical linguistic structure to represent the text utterance. The hierarchical linguistic structure includes a first level including a long short-term memory (LSTM) processing cell representing each word of the text utterance, a second level including a LSTM processing cell representing each syllable of the text utterance, a third level including a LSTM processing cell representing each phoneme of the text utterance, and a fourth level including a LSTM processing cell representing each of a plurality of fixed-length speech frames, the LSTM processing cells of the fourth level clocking relative to and faster than the LSTM processing cells of the third level. The LSTM processing cells of the second level clock relative to and faster than the LSTM processing cells of the first level, the LSTM processing cells of the third level clock relative to and faster than the LSTM processing cells of the second level, and the LSTM processing cells of the fourth level clock relative to and faster than the LSTM processing cells of the third level. In these examples, each of the plurality of fixed-length speech frames may represent a respective portion of the predicted vocoder parameters output from the vocoder model. Additionally, in these examples, the first level of the hierarchical linguistic structure may generate an activation for each word of the text utterance in a single first pass, the second level of the hierarchical linguistic structure may generate an activation for each syllable of the text utterance in a single second pass subsequent to the first pass, the third level of the hierarchical linguistic structure may generate an activation for each phoneme of the text utterance in a single third pass subsequent to the second pass, and the fourth level of the hierarchical linguistic structure may generate an activation for each fixed-length speech frame of the plurality of fixed-length speech frames in a single fourth pass subsequent to the third pass.

The operations may further include: receiving training data including a plurality of reference audio signals and corresponding transcripts. Each reference audio signal includes a spoken utterance of speech and has a corresponding prosody, while each transcript includes a textual representation of the corresponding reference audio signal. For each reference audio signal and corresponding transcript pair, the operations may also include: obtaining a reference linguistic specification of the corresponding transcript and reference prosodic features representing the corresponding prosody of the corresponding reference audio signal, and training, using a deep neutral network, the vocoder model to generate, form the reference linguistic specification and the reference prosodic features, a sequence of fixed-length predicted speech frames providing Mel-ceptrum coefficients, aperiodicity components, and voicing components. In some examples, training the vocoder model further includes: sampling, from the corresponding reference audio signal, a sequence of fixed-length reference speech frames providing reference Mel-cepstrum coefficients, reference aperiodicity components, and reference voicing components of the reference audio signal; generating gradients/losses between the sequence of fixed-length predicted speech frames generated by the vocoder model and the sequence of fixed-length reference speech frames sampled from the corresponding reference audio signal and back-propagating the gradients/losses through the vocoder model.

In some implementations, the operations further include splitting the predicted vocoder parameters output from the vocoder model into Mel-cepstrum coefficients, aperiodicity components, and voicing components. In these implementations, the operations also include, separately denormalizing the Mel-cepstrum coefficients, a periodicity components, and voicing components. In these implementations, the operations also include, concatenating the prosodic features output from the prosody model, the denormalized Mel-cepstrum coefficients, the normalized aperiodicity components, and the denormalized voicing components into a vocoder vector. In these implementations, providing the predicted vocoder parameters output from the vocoder model and the prosodic features output from the prosody model to the parametric vocoder includes providing the vocoder vector to the parametric vocoder as input for generating the synthesized speech representation of the text utterance.

DESCRIPTION OF DRAWINGS

Like reference symbols in the various drawings indicate like elements.

DETAILED DESCRIPTION

Figure 1:
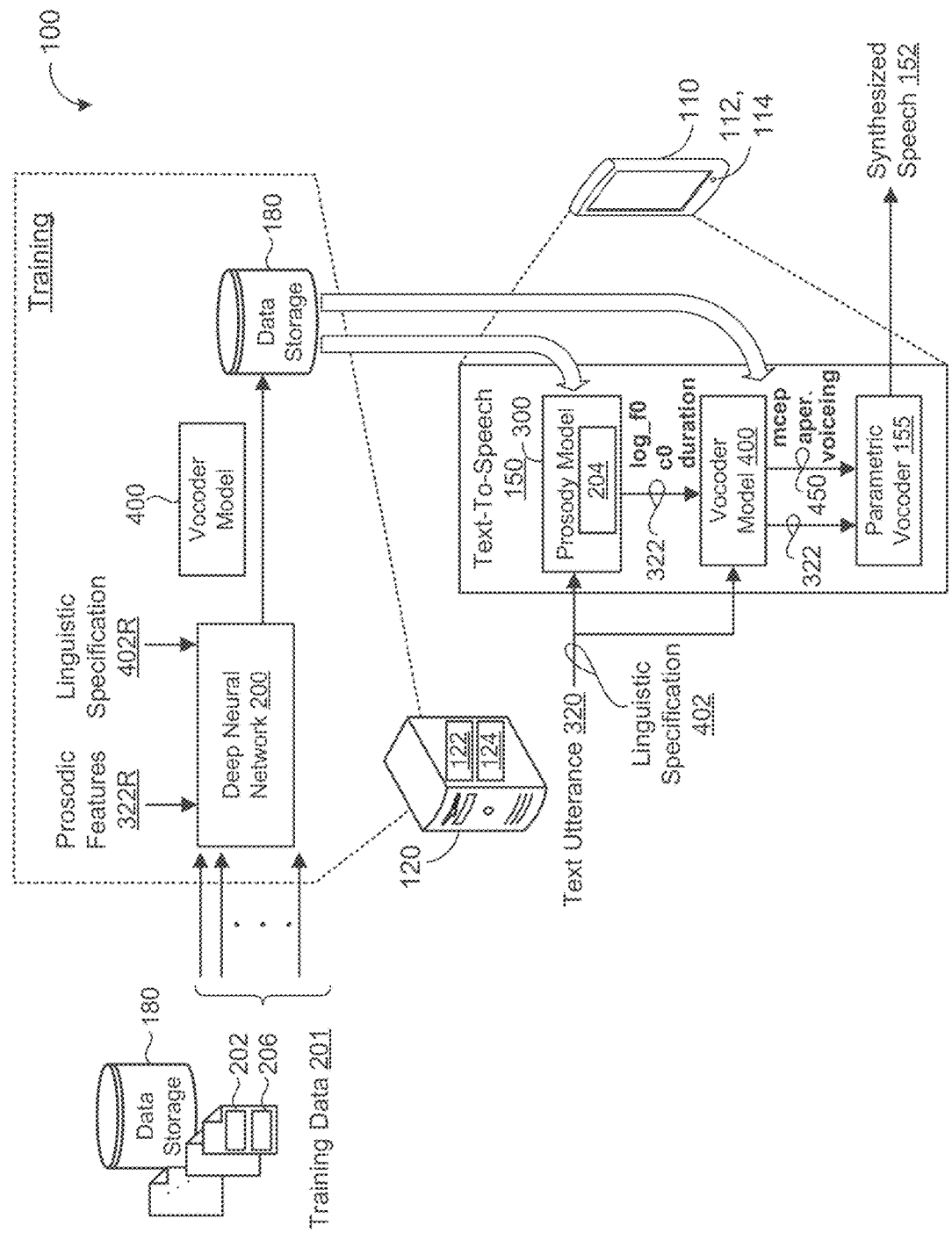
FIG. 1 is a schematic view of an example system for training a deep neural network to provide a vocoder model for use in predicting vocoder parameters from prosodic features representing an intended prosody for a text utterance.

Text-to-speech (ITS) models, often used by speech synthesis systems, are generally only given text inputs without any reference acoustic representation at runtime, and must impute many linguistic factors that are not provided by the text inputs in order to produce realistically sounding synthesized speech. A subset of these linguistic factors are collectively referred to as prosody and may include intonation (pitch variation), stress (stressed syllables vs. non-stressed syllables), duration of sounds, loudness, tone, rhythm, and style of the speech Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. Accordingly, a given text input that is associated with a high degree of prosodic variation can produce synthesized speech with local changes in pitch and speaking duration to convey different semantic meanings, and also with global changes in the overall pitch trajectory to convey different moods and emotions.

Neural network models provide potential for robustly synthesizing speech by predicting linguistic factors corresponding to prosody that are not provided by text inputs. As a result, a number of applications, such as audiobook narration, news readers, voice design software, and conversational assistants can produce realistically sounding synthesized speech that is not monotonous-sounding. Recent advances in variational autoencoders (VACs) enable predicting prosodic features of duration, pitch contour, and energy contour for effectively modeling prosody of synthesized speech. While these predicted prosodic features are sufficient for driving large state-of-the-art neural network-based acoustic models that operate on linguistic and prosodic features, such as WaveNet or WaveRNN models, these predicted prosodic features are insufficient for driving parametric vocoders which require many additional vocoder parameters. That is, in addition to prosodic features of pitch, energy, and phoneme duration, parametric vocoders require a multitude of additional vocoder parameters including mel-cepstrum coefficients (MCEPs), aperiodicity components, and voice components of each speech unit, e.g., typically a fixed-length frame (e.g., 5 milliseconds). As a result, parametric vocoders have not been able to benefit from the improvements in modeling prosody by the VACs Yet, relative to the large state-of-the-art neural network-based acoustic models that run on servers, parametric vocoders are associated with low processing and memory requirements, rendering the parametric vocoder models a preferred choice for use in the on-device setting where constraints on processing and memory are relaxed.

Implementations herein are directed toward a two-stage speech synthesis system incorporating a prosody model and a neural network vocoder model. During the first stage, the prosody model is configured to predict prosodic features that represent an intended prosody for a text utterance. The prosodic features represent acoustic information for the text utterance in terms of pitch (F0), phoneme duration, and energy (C0). The prosodic features predicted by the prosody model, however, include only a portion of a multitude of vocoder parameters required for driving a parametric vocoder. During the second stage, the neural network vocoder model is configured to receive, as input, the prosodic features predicted by the prosody model and generate, as output, a remaining portion of the vocoder parameters for use in driving the parametric vocoder to produce a synthesized speech representation of the text utterance and having the intended prosody. The prosody model may incorporate a variational autoencoder (VAE) that is optimized for predicting prosodic features to provide higher-quality prosodic representations for text utterances than conventional statistical parametric models are capable of producing. These conventional statistical parametric models are tasked with generating all vocoder parameters including MCEPs, aperiodicity components, and voice components, in addition to prosodic features of pitch, energy, and phoneme duration.

Advantageously, the neural network vocoder model may leverage the capability of the prosody model to accurately predict the prosodic features representing the intended prosody of the text utterance, and use these predicted prosodic features for the dual purpose of: input to the vocoder model for predicting the remaining vocoder parameters required for driving the parametric vocoder; and pass-through the vocoder model for driving the parametric vocoder in combination with the remaining vocoder parameters predicted by the vocoder model. That is, the prosodic features predicted by the prosody model and the remaining vocoder parameters predicted by the vocoder model may collectively provide all the required vocoder parameters needed to drive the parametric vocoder for generating the synthesized speech representation of the text utterance and having the intended prosody. Accordingly, by leveraging the prosody model optimized for modeling prosody and incorporating the neural network vocoder model to predict the remaining vocoder parameters, an on-device parametric vocoder may be employed to produce synthesized speech representations with improved prosody.

The VAE-based prosody model of the present disclosure includes a Clockwork Hierarchal Variational Autoencoder (CHiVE) having an encoder portion and a decoder portion. The encoder portion of the CHiVE may train utterance embeddings representing prosody by encoding numerous reference audio signals conditioned on prosodic features and a linguistic specification associated with each reference audio signal. As aforementioned, the prosodic features represent acoustic information about the reference audio signals in terms of pitch (F0), phoneme duration, and energy (C0). For instance, the prosodic features may include phoneme durations and fixed-length frames of pitch and energy sampled from the reference audio signal. The linguistic specification may include, without limitation: phoneme-level linguistic features, containing information about the position of a phoneme in a syllable, the phoneme identity, and a number of phonemes in a syllable; syllable-level linguistic features, containing information such as whether a syllable identity and whether the syllable is stressed or unstressed; word-level linguistic features, containing information such as a part-of-speech of a word indicating whether the word is a noun/adjective/verb; and sentence-level linguistic features containing information about a speaker, a gender of the speaker, and/or whether the utterance is a question or phrase. In some examples, the prosody model includes a Bidirectional Encoder Representations from Transformers (BERT) model that is configured to output wordpiece embeddings. In these examples, the wordpiece embeddings may replace the word-level linguistic features that would otherwise encode syntactic information about each word explicitly.

Each utterance embedding encoded by the encoder portion may be represented by a fixed-length numerical vector. In some implementations, the fixed-length numerical vector includes a value equal to 256. However, other implementations may use fixed-length numerical vectors having values greater than or less than 256. The decoder portion may decode a fixed-length utterance embedding into a sequence of phoneme durations via a first decoder and into a sequence of fixed-length frames (e.g., five millisecond) of pitch and energy using the phoneme durations. The fixed-length utterance embedding may represent an intended prosody for input text to be synthesized into speech. The sequence of phoneme durations and fixed-length frames of pitch and energy correspond to prosodic features predicted by the decoder portion. During training, the prosodic features of phoneme durations and fixed-length frames of pitch and energy predicted by the decoder portion closely match the prosodic features of phoneme durations and fixed-length frames of pitch and energy sampled from the reference audio signal associated with the fixed-length utterance embedding.

The neural network vocoder model of the present disclosure is trained to predict vocoder parameters conditioned on reference prosodic features and linguistic specifications for the training text utterances. That is, the vocoder model receives, as input, prosodic features representing an intended prosody for a training text utterance and a linguistic specification of the training text utterance, and predicts, as output, the vocoder parameters based on the reference prosodic features and the linguistic specification of the text utterance. The vocoder parameters include MCEPs, aperiodicity components, and voice components of each speech unit, e.g., typically a fixed-length frame (e.g, 5 milliseconds). The prosodic feature of energy contour/level C0 is the $0^{th}$ MCEP required for driving a parametric vocoder. Accordingly, the vocoder model may be configured to predict the remaining MCEPs $C[1-n^{th}]$ for driving the parametric vocoder. Each training text utterance may have one or more words each having one or more syllables, and each syllable having one or more phonemes. Accordingly, the linguistic specification for each training text utterance includes sentence-level linguistic features for the text utterance, word-level linguistic features for each word of the text utterance, syllable-level linguistic features for reach syllable of the text utterance, and phoneme-level linguistic features for each phoneme of the text utterance.

The CHiVE-based prosody model and the neural network vocoder model may each incorporate a hierarchical structure of hierarchical stacked layers of long-short term-memory (LSTM) cells, with each layer of LSTM cells incorporating structure of a text utterance such that one layer represents fixed-length frames, a next layer represents phonemes, a next layer represents syllables, and another layer represents words. Moreover, the hierarchy of stacked layers of LSTM cells are variably clocked to a length of hierarchical input data. For instance, if the input data (e.g., text utterance) contains a word of three syllables followed by a word of four syllables, then the syllable layer of the hierarchical structure would clock three times relative to a single clock of the word layer for the first input word, and then the syllable layer would clock four more times relative to a subsequent single clock of the word layer for the second word.

During inference, the CHiVE-based prosody model is configured to receive a text utterance and select an utterance embedding for the text utterance. Utterance embeddings may be categorized for different prosodic domains including, without limitation news reader, sports broadcaster, lecturer, or story reading. Utterance embeddings may also be more fine-grained to include sub-domains. For instance, a story reading domain may include utterance embeddings for conveying suspense for thriller novels, as well as utterance embeddings to convey different emotions aligned with the context of a given chapter in an e-book. A user may select the utterance embedding that conveys the intended prosody, or the utterance embedding may be selected as the utterance embedding paired with a text utterance closely matching the received text utterance to be synthesized into speech. The received text utterance has at least one word, each word has at least one syllable, and each syllable has at least one phoneme Since the text utterance is missing context, semantic information, and pragmatic information to guide the appropriate prosody for producing synthesized speech from the utterance, the CHiVE-based prosody model uses that selected utterance embedding as the latent variable to represent an intended prosody. Thereafter, the CHiVE-based prosody model concatenates the selected utterance embedding with sentence-level, word-level, and syllable-level linguistic features obtained from the text utterance to predict a duration of each syllable and predict a pitch of each syllable based on the predicted duration for the syllable. Lastly, the CHiVE-based prosody model is configured to generate a plurality of fixed-length pitch frames based on the predicted duration for each syllable such that each fixed-length pitch frame represents the predicted pitch of the syllable. The plurality of fixed-length pitch frames may provide a log f0 to represent the fundamental frequency of the text utterance on log scale. The CHiVE-based prosody model may similarly predict energy (e.g., loudness) of each syllable based on the predicted duration for the syllable and generate a plurality of fixed-length energy frames each representing the predicted energy c0 of the syllable, where c0 is the $0^{th}$ MCEP.

The linguistic specification (e.g, sentence-level, word-level, syllable-level, and phoneme-level linguistic features) for the text utterance and the fixed-length pitch and/or energy frames output from the prosody model may be provided as input to the neural network vocoder model for generating, as output, predicted vocoder parameters including MCEPs ($c[1-n^{th}]$), aperiodicity components, and voicing components for each speech unit. Namely, the neural network vocoder model is configured to predict a plurality of fixed-length speech frames (e.g., 5 ms frames) that each represent a respective portion of the predicted vocoder parameters. Moreover, the vocoder model may insert the prosodic features of pitch f0, energy c0, and phoneme duration predicted by the prosody model into the appropriate fixed-length speech frame for driving a parametric vocoder with all the required vocoder parameters. Here, the portion of the vocoder parameters driving the parametric vocoder that describe prosody are obtained from the prosody model optimized for modeling prosody and the remaining portion of the vocoder parameters are obtained from the vocoder model based on the prosodic features.

FIG. 1 shows an example system 100 for training a deep neural network 200 to provide a vocoder model 400, and for using the trained vocoder model 400 to predict vocoder parameters 450 for a text utterance 320 to drive a parametric vocoder 155. During training, the system 100 incorporates a computing system 120 having data processing hardware 122 and memory hardware 124 in communication with the data processing hardware 122 and storing instructions that cause the data processing hardware 122 to perform operations. In some implementations, the computing system 120 (e.g., the data processing hardware 122) provides a trained prosody model 300 and the trained vocoder model 400 based on a trained deep neural network 200 to a text-to-speech (TTS) system 150 for controlling prosody of synthesized speech 152 from an input text utterance 320. Namely, the trained prosody model 300 and the trained vocoder model 400 work in tandem to produce all required vocoder parameters 322, 450 required for driving the parametric vocoder 155 on the TTS system 150 to produce the synthesized speech 152 with an intended prosody. In the example shown, the TTS system 150 resides on a user device 110, such as a smart phone, smart watch, smart speaker/display, smart appliance, laptop, desktop computer, tablet, or other computing device associated with a user. In other examples, the computing system 120 implements the TTS system 150. The computing system 120 used to train the vocoder model 400, and optionally train the prosody model 300, may include a distributed system (e.g., cloud computing environment). The user device 110 has data processing hardware 112 and memory hardware 114 in communication with the data processing hardware 112 and storing instructions that cause the data processing hardware 112 to perform operations such as executing the prosody and vocoder models 300, 400 for producing vocoder parameters 322, 450 from an input text utterance 320 and driving the parametric vocoder 155 on the vocoder parameters 322, 450 to produce synthesized speech 152. The synthesized speech 152 may be audibly output by a speaker in communication with the user device 110. For instance, the speaker may reside on the user device 110 or may be a separate component in communication with the user device 110 via a wired or wireless connection.

Since the input text utterance 320 has no way of conveying context, semantics, and pragmatics to guide the appropriate prosody of the synthesized speech 152, the prosody model 300 may predict a prosodic representation 322 for the input text utterance 320 by conditioning the model 300 on a linguistic specification 402 extracted from the text utterance 320, and using a fixed-length utterance embedding 204 as a latent variable representing an intended prosody for the text utterance 320. That is, during inference, the prosody model 300 may predict the prosodic representation 322 for the text utterance 320 using the selected utterance embedding 204. The prosodic representation 322 may include prosodic features of predicted pitch, predicted timing, and predicted loudness (e.g., energy) for the text utterance 320. Accordingly, the terms 'prosodic representation' and 'prosodic features' may be used interchangeably. Thereafter, the prosodic features 322 predicted by the prosody model 300 are fed as input to the vocoder model 400 to predict remaining vocoder parameters 450 required for driving the parametric vocoder 155. That is, the parametric vocoder 155 is not capable of producing synthesized speech 152 for the input text utterance 322 from the prosodic features 322 predicted by the prosody model 300 alone, and further requires a multitude of additional vocoder parameters 450 for producing the synthesized speech 152. The additional vocoder parameters 450 predicted by the vocoder model 400 include MCEPs ($c[1-n^{th}]$), aperiodicity components, and voicing components for each speech unit. Described in greater detail below with reference to FIGS. 2 and 4, the neural network vocoder model 400 is configured to predict a plurality of fixed-length speech frames 280V0 (e.g., 5 ms frames) that each represent a respective portion of the predicted vocoder parameters 450. Lastly, the vocoder model 400 is configured to provide the predicted vocoder parameters 450 output from the vocoder model 400 and the prosodic features 322 output from the prosody model 300 to the parametric vocoder 155, whereby the parametric vocoder 155 is configured to generate a synthesized speech representation 152 of the text utterance 320 and having the intended prosody. The vocoder parameters 450 and the prosodic features 322 may be concatenated into a single output vector for driving the parametric vocoder 155.

In some implementations, the deep neural network 200 incorporating the vocoder model 400 is trained on a large set of training data 201 stored on data storage 180 (e.g., memory hardware 124). The training data 201 includes a plurality of reference audio signals 202 and corresponding transcripts 206. Each reference audio signal 202 may include a spoken utterance of speech (e.g., human speech recorded by a microphone) and having a prosodic representation. Each transcript 206 may include a textual representation of the corresponding reference audio signal 202. For each reference audio signal 204 and corresponding transcript 206 pair, the deep neural network 200 obtains a reference linguistic specification 402R of the corresponding transcript 206 and reference prosodic features 322R representing the corresponding prosody of the corresponding reference audio signal 202. Thereafter, the deep neural network 200 trains the vocoder model 400 to generate, from the reference linguistic specification 402R and the reference prosodic features 322R, the additional vocoder parameters 450 as a sequence of fixed-length predicted speech frames providing MCEPs ($c[1-n^{th}]$), aperiodicity components, and voicing components for each frame. The voicing components for each frame (e.g., speech unit) may indicate whether the corresponding frame is voiced or unvoiced. Ground-truth values of the vocoder parameters 450 may be sampled from the reference audio signal 202 as a sequence of fixed-length predicted speech frames. In some examples, the reference prosodic features 322R of pitch, energy, and phoneme duration are sampled from the corresponding reference audio signal 202. In other examples, the reference prosodic features 322R correspond to prosodic features 322 predicted by a fully-trained prosody model 300 that receives the reference linguistic specification 402R and the corresponding transcript 206 as input and uses an utterance embedding 204 representing the intended prosody. In some implementations (not shown), the prosody model 300 and the vocoder model 400 are trained jointly on the training data 201. Here, the prosody model 300 may be trained to encode utterance embeddings 204 each representing prosody of a corresponding reference audio signal 202 and decode each utterance embedding 204 conditioned on the reference linguistic specification 402R to predict the prosodic features 322. In these implementations, the prosodic features 322 predicted by the prosody model 300 during joint training, serve as reference prosodic features 322R fed together with the reference linguistic specification 402R as training input to the vocoder model 400 for predicting the additional vocoder parameters 450R.

In the example shown, the computing system 120 stores the trained prosody and vocoder models 300, 400 on data storage 180. The user device 110 may obtain the trained prosody and vocoder models 300, 400 from the data storage 180 or the computing system 120 may push the models 300, 400 to the user device 110 directly after training and/or retraining either one of or both of the models 300, 400. The TTS system 150 executing on the user device 110 may employ the parametric vocoder 155 configured to receive, as input, the prosodic features 322 and remaining vocoder parameters 450 and generate, as output, the synthesized speech representation 152 for the text utterance 320 and having the intended prosody.

When predicting the prosodic features 322 that convey the intended prosody for the text utterance 320, the prosody model 300 may select an utterance embedding 204 for the text utterance 320 that represents the intended prosody. Described in greater detail below with reference to FIGS. 3A and 3B, the prosody model 300 may predict the prosodic representation 322 for the text utterance 320 using the selected utterance embedding 204.

Figure 2:
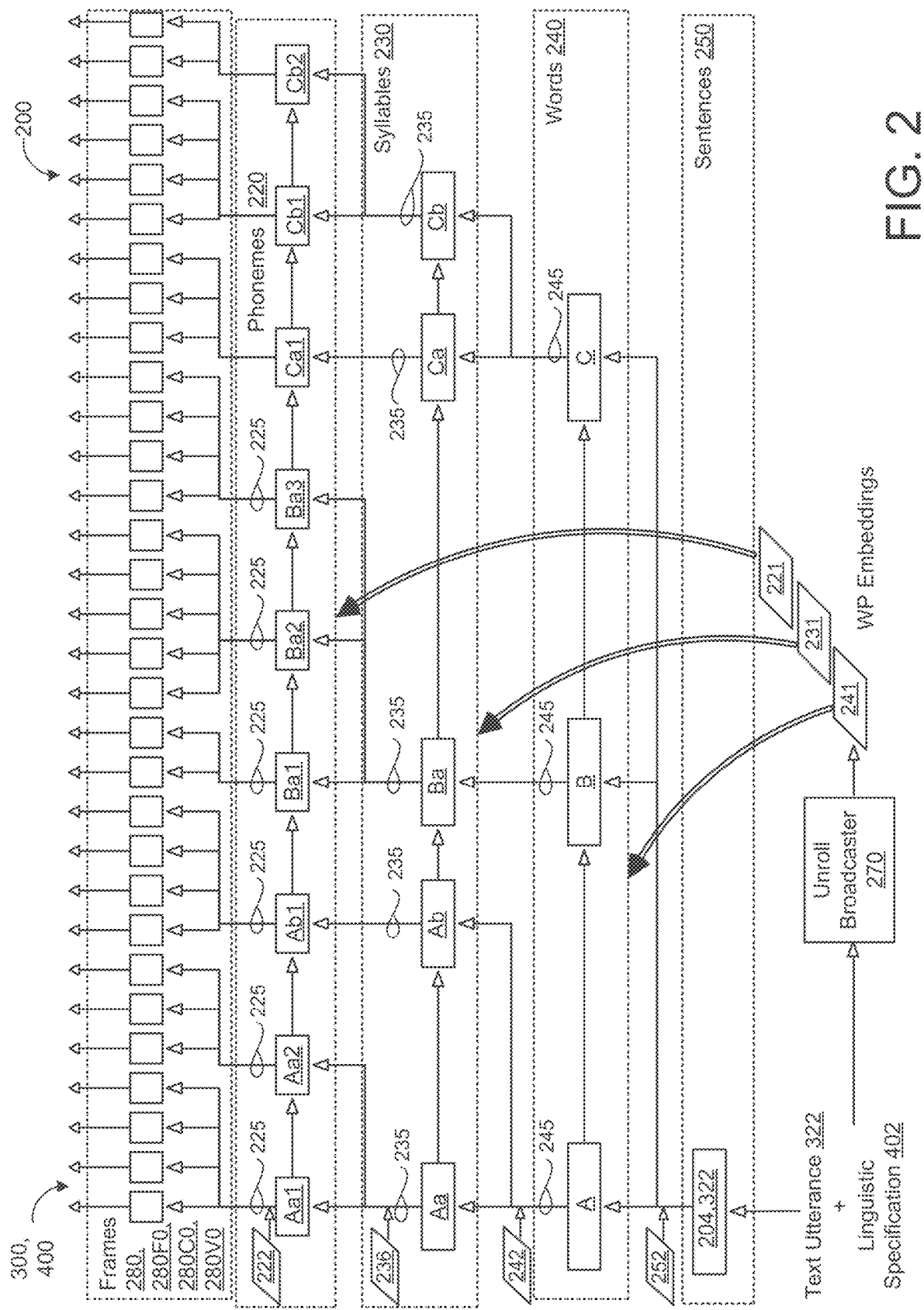
FIG. 2 is a schematic view the vocoder model of FIG. 1 incorporating a hierarchical linguistic structure to represent text utterances.

FIG. 2 shows a hierarchical linguistic structure (e.g., deep neural network of FIG. 1) 200 for representing text utterances 320 to be synthesized each of the prosody model 300 (i.e., a clockwork hierarchal variational autoencoder (CHiVE) or simply 'autoencoder) and the vocoder model 400 may incorporate. The prosody model 300 incorporates the hierarchical linguistic structure 200 to provide a controllable model of prosody for jointly predicting, for each syllable of given input text, a duration of the syllable (and/or a duration of each phoneme in the syllable) and pitch (F0) and energy (C0) contours for the syllable without relying on any unique mappings from the given input text or other linguistic specification to produce synthesized speech 152 having an intended/selected prosody. With respect to the prosody model 300, the hierarchal linguistic structure 200 is configured to decode a fixed-length utterance embedding 204 representing an intended prosody for the given input text into a plurality of fixed-length predicted frames 280 (e.g., to predict pitch (F0), energy (C0)). With respect to the vocoder model 400, the hierarchical linguistic structure 200 is configured to predict a plurality of fixed-length speech frames 280, 280V from the linguistic specification 402 of the text utterance 320 and the plurality of fixed-length predicted frames 280F0, 280C0 output from the prosody model 300 as the prosodic features 322 representing the intended prosody for the input text. Each fixed-length speech frame 280V may include a respective portion of the remaining vocoder parameters 450 of MCEP ([C1–nth]), aperiodicity components, and voicing components of each speech input (e.g., each frame) predicted by the vocoder model 400.

The hierarchical linguistic structure 200 represents a text utterance 322 as hierarchical levels of sentence 250, words 240, syllables 320, phonemes 220, and fixed length frames 280. More specifically, each of the stacked hierarchical levels include Long Short-Term Memory (LSTM) processing cells variably clocked to a length of the hierarchical input data. For instance, the syllable level 230 clocks faster than the word level 240 and slower than the phoneme level 220. The rectangular blocks in each level correspond to LSTM processing cells for respective words, syllables, phonemes, or frames. Advantageously, the hierarchical linguistic structure 200 gives the LSTM processing cells of the word level 240 memory over the last 100 words, gives the LSTM cells of the syllable level 230 memory over the last 100 syllables, gives the LSTM cells of the phoneme level 220 memory over the last 100 phonemes, and gives the LSTM cells of the fixed-length pitch and/or energy frames 280 memory over the last 100 fixed-length frames 280. When the fixed-length frames 280 include a duration (e.g, frame rate) of five milliseconds each, the corresponding LSTM processing cells provide memory over the last 500 milliseconds (e.g., a half second).

In the example shown, the hierarchical linguistic structure 200 represents the text utterance 322 as a sequence of three words 240A-240C at the word level 240, a sequence of five syllables 230Aa-230Cb at the syllable level 230, and a sequence of nine phonemes 220Aa1-220Cb2 at the phoneme level 220 to generate the sequence of predicted fixed-length frames 280 at the frame level 280. In some implementations, the prosody model 300 and/or the vocoder model 400 incorporating the hierarchical linguistic structure 200 receives linguistic feature alignment activations 221, 231, 241 for the linguistic specification 402 of the text utterance 320. For instance, before processing occurs, an unroll broadcaster 270 may provide the linguistic feature alignment activations 221, 231, 241 as input to prosody model 300 and/or the vocoder model 400. For simplicity, each of the prosody model 300 and the vocoder model 400 receive the linguistic feature alignment activations 221, 231, 241. However, only one of the models 300, 400 may receive the alignment activations 221, 231, 241.

In some examples, the unroll broadcaster 270 broadcasts word-level alignment activations 241 to the word level 240 of the hierarchical linguistic structure 200, syllable-level alignment activations 231 to the syllable level 230 of the hierarchical linguistic structure 200, and phoneme-level alignment activations 221 to the phoneme level 220 of the hierarchical linguistic structure 200. Each word-level alignment activation 241 aligns an activation 245 of each word 240 with syllable-level linguistic features 236 for each syllable 230 of the word 240. Each syllable-level alignment activation 231 aligns an activation 235 of each syllable 230 with the phoneme-level linguistic features 222 for each phoneme 220 of the syllable 230. In these examples, the activation 245 of each word 240 is based on the word-level linguistic features 242 for the corresponding word 240 and the sentence-level linguistic features 252.

In some implementations, the models 300, 400 use the received linguistic feature alignment activations 221, 231, 241 each of the variable rate stacked hierarchical levels of the hierarchical linguistic structure 200 in a single pass, i.e., as a single time series batch. Here, the unroll broadcaster 270 may broadcast the alignment activations 221, 231, 241 by converting a delta between loop start and end indices into a sequence of gather indices for correctly broadcasting the corresponding activations 225, 235, 245 between the layers/levels of the hierarchical linguistic structure 200. In these implementations, the word-level 240 of the hierarchical linguistic structure generates an activation 245 for each word 240 of the text utterance 322 in a single first pass, the syllable-level 230 of the hierarchical linguistic structure generates an activation for each syllable of the text utterance in a single second pass subsequent to the first pass, the phoneme-level 220 of the hierarchical linguistic structure generates an activation for each phoneme of the text utterance in a single third pass subsequent to the second pass, and the frame-level 280 of the hierarchical linguistic structure generates an activation for each fixed-length frame in a single fourth pass subsequent to the third pass. For the prosody model, the frame-level 280 may generate activations for fixed-length pitch frames 280F0 and fixed-length energy frames 280C0 in single passes in parallel. These implementations refer to a four-pass inference which permits unrolling each layer 240, 230, 220, 280 of the hierarchical linguistic structure 200 representing the entire text utterance 320 in a single pass before moving on to the next level in the hierarchy. On the other hand, two-pass inherence splits the word-level, syllable-level, and phoneme-levels 240, 230, 220 into a first pass by producing a variable number of syllables for each word which can in turn produce a variable number of phonemes. Then, a second pass runs over the output of the phonemes to form the frames level to produce the output frames 280 for the word. This two-pass will repeat for each word in the text utterance 320 associated with a sentence. While this split in two-pass inference improves speeds for executing the prosody model 300 and the vocoder model 400 on a server (e.g., computing system 120 of FIG. 1) where processing and memory resources are not constrained, the four-pass inference optimizes processing speeds for executing the prosody model 300 and the vocoder model 400 on-device (e.g., user device 110 of FIG. 1). That is, when implementing the prosody and vocoder models 300, 400 on-device, the two-pass inference is shown to be thirty-percent (30%) faster than the four-pass inference.

Figure 3A:
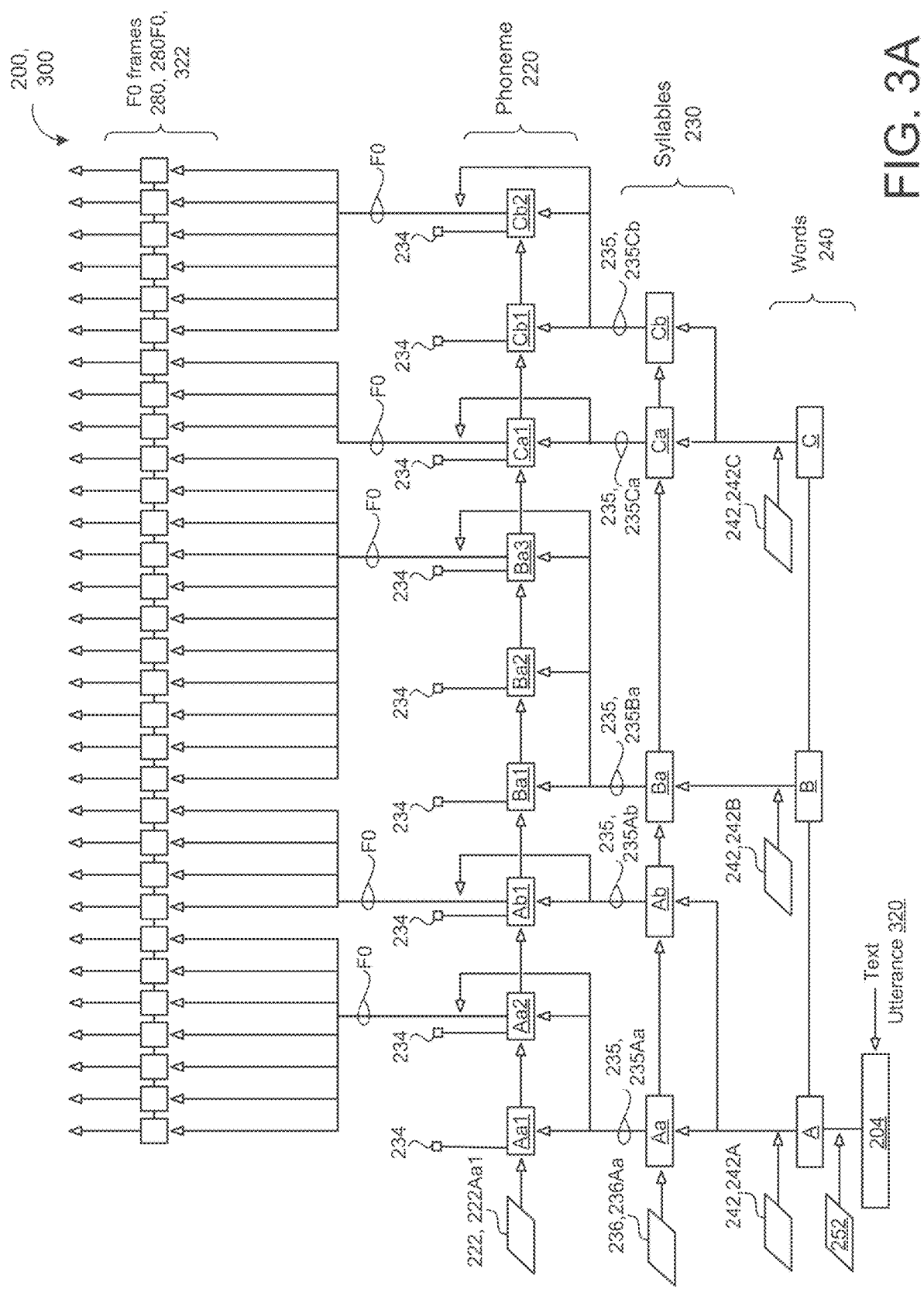
FIG. 3A is a schematic view of an example autoencoder for predicting duration and pitch contours for each syllable of a text utterance.
Figure 3B:
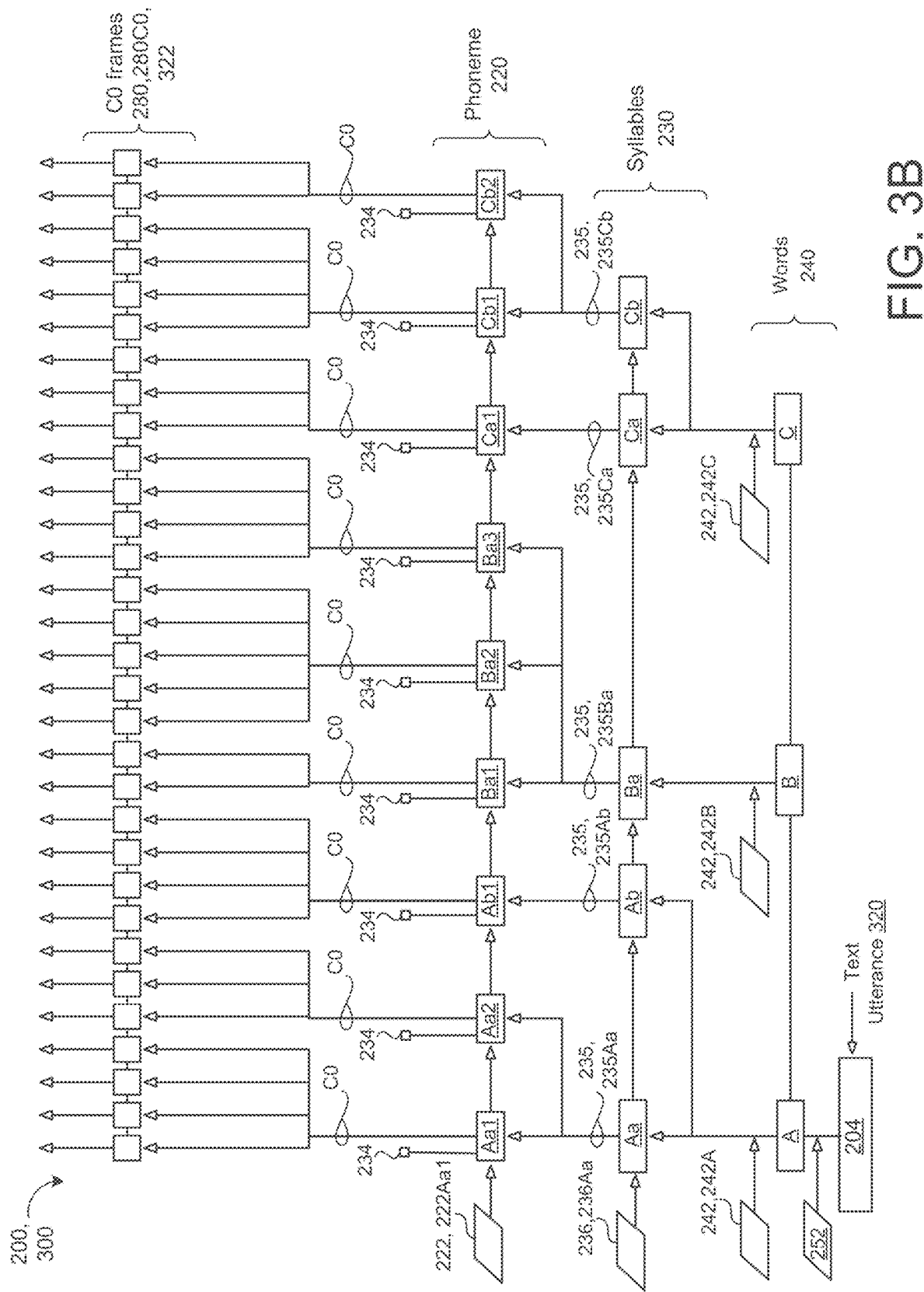
FIG. 3B is a schematic view of an example autoencoder for predicting duration and energy contours for each phoneme of a text utterance.

Referring to FIGS. 3A and 3B, in some implementations, the autoencoder (i.e., prosody model) 300 uses the hierarchical linguistic structure 200 to predict a prosodic representation 322 for a given text utterance 320 during inference by jointly predicting durations of phonemes 220 and pitch and/or energy contours for each syllable 230 of the given text utterance 320. Since the text utterance 320 does not provide any context, semantic information, or pragmatic information to indicate an appropriate prosody for the text utterance, the autoencoder 300 selects an utterance embedding 206 as a latent variable to represent an intended prosody for the text utterance 320.

The utterance embedding 204 may be selected from the utterance embedding data storage 180 (FIG. 1). Each utterance embedding 204 in the storage 180 may be encoded from a corresponding variable-length reference audio signal 202 (FIG. 1) during training. Specifically, the autoencoder 300 may include an encoder portion (not shown) that compresses prosody of variable-length reference audio signals 202 into fixed-length utterance embeddings 204 during training and stores each utterance embedding 204 together with a transcript 206 of the corresponding reference audio signal 202 in the data storage 180 for use during inference. In the example shown, the autoencoder 300 may first locate utterance embeddings 204 having transcripts 206 that closely match the text utterance 320 and then select one of the utterance embeddings 204 to predict the prosodic representation 322 (FIG. 1) for the given text utterance 320. In some examples, the fixed-length utterance embedding 204 is selected by picking a specific point in a latent space of embeddings 204 that likely represents particular semantics and pragmatics for a target prosody. In other examples, the latent space is sampled to choose a random utterance embedding 204 for representing the intended prosody for the text utterance 320. In yet another example, the autoencoder 300 models the latent space as multidimensional unit Gaussian by choosing a mean of the utterance embeddings 204 having closely matching transcripts 206 for representing a most likely prosody for the linguistic specification 402 associated with the text utterance 320. If the prosody variation of the training data is reasonably neutral, the last example of choosing the mean of utterance embeddings 204 is a reasonable choice. In some additional examples, a user of the user device 110 selects an intended prosody, such as a particular prosodic domain (e.g., news reader, lecturer, sports broadcaster), using an interface executable on the user device 110. Based on the intended prosody selected by the user, the autoencoder 300 may select the most suitable utterance embedding 204.

FIG. 3A shows the text utterance 320 having three words 240A, 240B, 240C represented in the word level 240 of the hierarchical linguistic structure 200. The first word 240A contains syllables 230Aa, 230Ab, the second word 240B contains one syllable 230Ba, and the third word 240C contains syllables 230Ca, 230Cb. Accordingly, the syllable level 230 of the hierarchical linguistic structure 200 includes a sequence of five syllables 230Aa-230Cb of the text utterance 320. At the syllable level 230 of LTSM processing cells, the autoencoder 300 is configured to produce/output a corresponding syllable embedding (e.g., syllable-level activation 235) 235Aa, 235Ab, 235Ba, 235Ca, 235Cb for each syllable 230 from the following inputs: the fixed-length utterance embedding 204; sentence-level linguistic features 252 associated with the text utterance 320; word-level linguistic features 242 (which may correspond to wordpiece embeddings produced by a BERT model 270) associated with the word 240 that contains the syllable 230; and syllable-level linguistic features 236 for the syllable 230. The sentence-level linguistic features 252 may include, without limitation, whether or not the text utterance 320 is a question, an answer to a question, a phrase, a sentence, a gender of a speaker, etc. The word-level linguistic features 242 may include, without limitation, whether the word is a noun, adjective, verb, or other part of speech. The syllable-level linguistic features 236 may include, without limitation, whether the syllable 240 is stressed or unstressed.

In the example shown, each syllable 230Aa, 230Ab, 230Ba, 230Ca, 230Cb in the syllable level 230 may be associated with a corresponding LTSM processing cell that outputs a corresponding syllable embedding 235Aa, 235Ab, 235Ba, 235Ca, 235Cb to the faster clocking phoneme level 220 for decoding the individual fixed-length predicted pitch (F0) frames 280, 280F0 (FIG. 3A) and for decoding the individual fixed-length predicted energy (C0) frames 280, 280C0 (FIG. 3B) in parallel FIG. 3A shows each syllable in the syllable level 230 including a plurality of fixed-length predicted pitch (F0) frames 280F0 that indicate a duration (timing and pauses) and a pitch contour for the syllable 230. Here, the duration and pitch contour correspond to a prosodic representation of the syllable 230. FIG. 3B shows each phoneme in the phoneme level 220 including a plurality of fixed-length predicted energy (C0) frames 280C0 that indicate a duration and an energy contour for the phoneme.

The first syllable 230Aa (i.e., LTSM processing cell Aa) in the syllable level 230 receives the fixed-length utterance embedding 204, sentence-level linguistic features 252 associated with the text utterance 320, word-level linguistic features 242A associated with the first word 240A, and the syllable-level linguistic features 236Aa for the syllable 236Aa as inputs for producing the corresponding syllable embedding 235Aa. The second syllable 230Ab in the syllable level 230 receives the fixed-length utterance embedding 204, the sentence-level linguistic features 252 associated with the text utterance 320, the word-level linguistic features 242A associated with the first word 240A, and corresponding syllable-level linguistic features 236 (not shown) for the syllable 230Ab as inputs for producing the corresponding syllable embedding 235Ab. While the example only shows syllable-level linguistic features 232 associated with the first syllable 230Aa, the corresponding syllable-level linguistic features 232 associated with each other syllable 230Ab-230Cb in the syllable level 230 are only omitted from the views of FIGS. 3A and 3B for the sake of clarity.

For simplicity, the corresponding syllable-level linguistic features 236 input to the processing block for syllable 230Ab are not shown. The LTSM processing cell (e.g., rectangle Ab) associated with the second syllable 230Ab also receives the state of the preceding first syllable 230Aa. The remaining sequence of syllables 230Ba, 230Ca, 230Cb in the syllable level 230 each produce corresponding syllable embeddings 235Ba, 235Ca, 235Cb in a similar manner. For simplicity, the corresponding syllable-level linguistic features 236 input to the processing block for each of the syllables 230Ba, 230Ca, 230Cb are not shown. Moreover, each LTSM processing cell of the syllable level 230 receives the state of the immediately preceding LTSM processing cell of the syllable level 240.

Referring to FIG. 3A, the phoneme level 220 of the hierarchical linguistic structure 200 includes the sequence of nine phonemes 220Aa1-220Cb2 each associated with a corresponding predicted phoneme duration 234. Moreover, the autoencoder 300 encodes the phoneme-level linguistic features 222 associated with each phoneme 220Aa1-220Cb2 with the corresponding syllable embedding 235 for predicting the corresponding predicted phoneme duration 234 and for predicting the corresponding pitch (f0) contour for the syllable containing the phoneme. The phoneme-level linguistic features 222 may include, without limitation, an identity of sound for the corresponding phoneme 230 and/or a position of the corresponding phoneme 230 in the syllable that contains the phoneme. While the example only shows phoneme-level linguistic features 222 associated with the first phoneme 220Aa1, the phoneme-level linguistic features 222 associated with the other phonemes 220Aa2-220Cb2 in the phoneme level 220 are only omitted from the views of FIGS. 3A and 3B for the sake of clarity.

The first syllable 230Aa contains phonemes 220Aa1, 220Aa2 and includes a predicted syllable duration equal to the sum of the predicted phone durations 234 for the phonemes 220Aa1, 220Aa2. Here, the predicted syllable duration for the first syllable 230Aa determines the number of fixed-length predicted pitch (F0) frames 280F0 to decode for the first syllable 230Aa. In the example shown, the autoencoder 300 decodes a total of seven fixed-length predicted pitch (F0) frames 280F0 for the first syllable 230Aa based on the sum of the predicted phoneme durations 234 for the phonemes 220Aa1, 220Aa2. Accordingly, the faster clocking syllable layer 230 distributes the first syllable embedding 235Aa as an input to each phoneme 220Aa1, 220Aa2 included in the first syllable 230Aa. A timing signal may also be appended to the first syllable embedding 235Aa. The syllable level 230 also passes the state of the first syllable 230Aa to the second syllable 230Ab.

The second syllable 230Ab contains a single phoneme 220Ab1 and therefore includes a predicted syllable duration equal to the predicted phoneme duration 234 for the phoneme 220Ab1 Based on the predicted syllable duration for the second syllable 230Ab, the autoencoder 300 decodes a total of four fixed-length predicted pitch (F0) frames 280F0 for the second syllable 230Ab. Accordingly, the faster clocking syllable layer 230 distributes the second syllable embedding 235Ab as an input to the phoneme 220Ab1. A timing signal may also be appended to the second syllable embedding 235Aa. The syllable level 230 also passes the state of the second syllable 230Ab to the third syllable 230Ba.

The third syllable 230Ba contains phonemes 220Ba1, 220Ba2, 220Ba3 and includes a predicted syllable duration equal to the sum of the predicted phoneme durations 234 for the phonemes 220Ba1, 220Ba2, 220Ba3. In the example shown, the autoencoder 300 decodes a total of eleven fixed-length predicted pitch (F0) frames 280F0 for the third syllable 230Ba based on the sum of the predicted phoneme durations 234 for the phonemes 220Ba1, 220Ba2, 220Ba3. Accordingly, the faster clocking syllable layer 230 distributes the third syllable embedding 235Ba as an input to each phoneme 220Ba1, 220Ba2, 220Ba3 included in the third syllable 230Ba. A timing signal may also be appended to the third syllable embedding 235Ba. The syllable level 230 also passes the state of the third syllable 230Ba to the fourth syllable 230Ca.

The fourth syllable 230Ca contains a single phoneme 220Ca1 and therefore includes a predicted syllable duration equal to the predicted phoneme duration 234 for the phoneme 220Ca1. Based on the predicted syllable duration for the fourth syllable 230Ca, the autoencoder 300 decodes a total of three fixed-length predicted pitch (F0) frames 280F0 for the fourth syllable 230Ca. Accordingly, the faster clocking syllable layer 240 distributes the fourth syllable embedding 235Ca as an input to the phoneme 220Ca1. A timing signal may also be appended to the fourth syllable embedding 235Ca. The syllable level 230 also passes the state of the fourth syllable 230Ba to the fifth syllable 230Cb.

Lastly, the fifth syllable 230Cb contains phonemes 220Cb1, 220Cb2 and includes a predicted syllable duration equal to the sum of the predicted phoneme durations 234 for the phonemes 220Cb1, 220Cb2. In the example shown, the autoencoder 300 decodes a total of six fixed-length predicted pitch (F0) frames 280F0 for the fifth syllable 230Cb based on the sum of the predicted phoneme durations 234 for the phonemes 220Cb1, 220Cb2 Accordingly, the faster clocking syllable layer 230 distributes the fifth syllable embedding 235Cb as an input to each phoneme 220Cb1, 220Cb2 included in the fifth syllable 230Cb. A timing signal may also be appended to the fifth syllable embedding 235Cb.

Still referring to FIG. 3A, the autoencoder 300 similarly decodes each of the remaining syllable embeddings 235Ab, 235Ba, 235Ca, 235Cb output from the syllable level 230 into individual fixed-length predicted pitch (F0) frames 280 for each corresponding syllable 230Ab, 230Ba, 230Ca, 230Cb. For instance, the second syllable embedding 235Ab is further combined at the output of the phoneme level 220 with the encoding of the second syllable embedding 235Ab and the corresponding phoneme-level linguistic features 222 associated with the phoneme 220Ab1, while the third syllable embedding 235Ba is further combined at the output of the phoneme level 220 with the encodings of the third syllable embedding 235Ba and the corresponding phoneme-level linguistic features 222 associated with each of the phonemes 220Ba1, 220Ba2, 220Ba3. Moreover, the fourth syllable embedding 235Ca is further combined at the output of the phoneme level 220 with the encodings of the fourth syllable embedding 235Ca and the corresponding phoneme-level linguistic features 222 associated with the phoneme 220Ca1, while the fifth syllable embedding 235Cb is further combined at the output of the phoneme level 220 with the encodings of the fifth syllable embedding 235Cb and the corresponding phoneme-level linguistic features 222 associated with each of the phonemes 220Cb1, 220Cb2. While the fixed-length predicted pitch (F0) frames 280F0 generated by the autoencoder 300 include frame-level LSTM, other configurations may replace the frame-level LSTM of pitch (F0) frames 280F0 with a feed-forward layer so that the pitch (F0) of every frame in a corresponding syllable is predicted in one pass.

Referring now to FIG. 3B, the autoencoder 300 is further configured to encode the phoneme-level linguistic features 222 associated with each phoneme 220Aa1-220Cb2 with the corresponding syllable embedding 235 for predicting the corresponding energy (C0) contour for each phoneme 220. The phoneme-level linguistic features 222 associated with phonemes 220Aa2-220Cb2 in the phoneme level 220 are only omitted from the view of FIG. 3B for the sake of clarity. The autoencoder 300 determines the number of fixed-length predicted energy (C0) frames 280, 280C0 to decode for each phoneme 220 based on the corresponding predicted phoneme duration 234. For instance, the autoencoder 300 decodes/generates four (4) predicted energy (C0) frames 280C0 for the first phoneme 220Aa1, three (3) predicted energy (C0) frames 280C0 for the second phoneme 220Aa2, four (4) predicted energy (C0) frames 280C0 for the third phoneme 220Ab1, two (2) predicted energy (C0) frames 280C0 for the fourth phoneme 220Ba1, five (5) predicted energy (C0) frames 280C0 for the fifth phoneme 220Ba2, four (4) predicted energy (C0) frames 280C0 for the sixth phoneme 220Ba3, three (3) predicted energy (C0) frames 280C0 for the seventh phoneme 220Ca1, four (4) predicted energy (C0) frames 280C0 for the eighth phoneme 220Cb1, and two (2) predicted energy (C0) frames 280C0 for the ninth phoneme 220Cb2. Accordingly, as with the predicted phoneme duration 234, the predicted energy contour for each phoneme in the phoneme level 220 is based on an encoding between the syllable embedding 235 input from the corresponding syllable in the slower clocking syllable level 230 that contains the phoneme and the linguistic features 222 associated with the phoneme.

Figure 4:
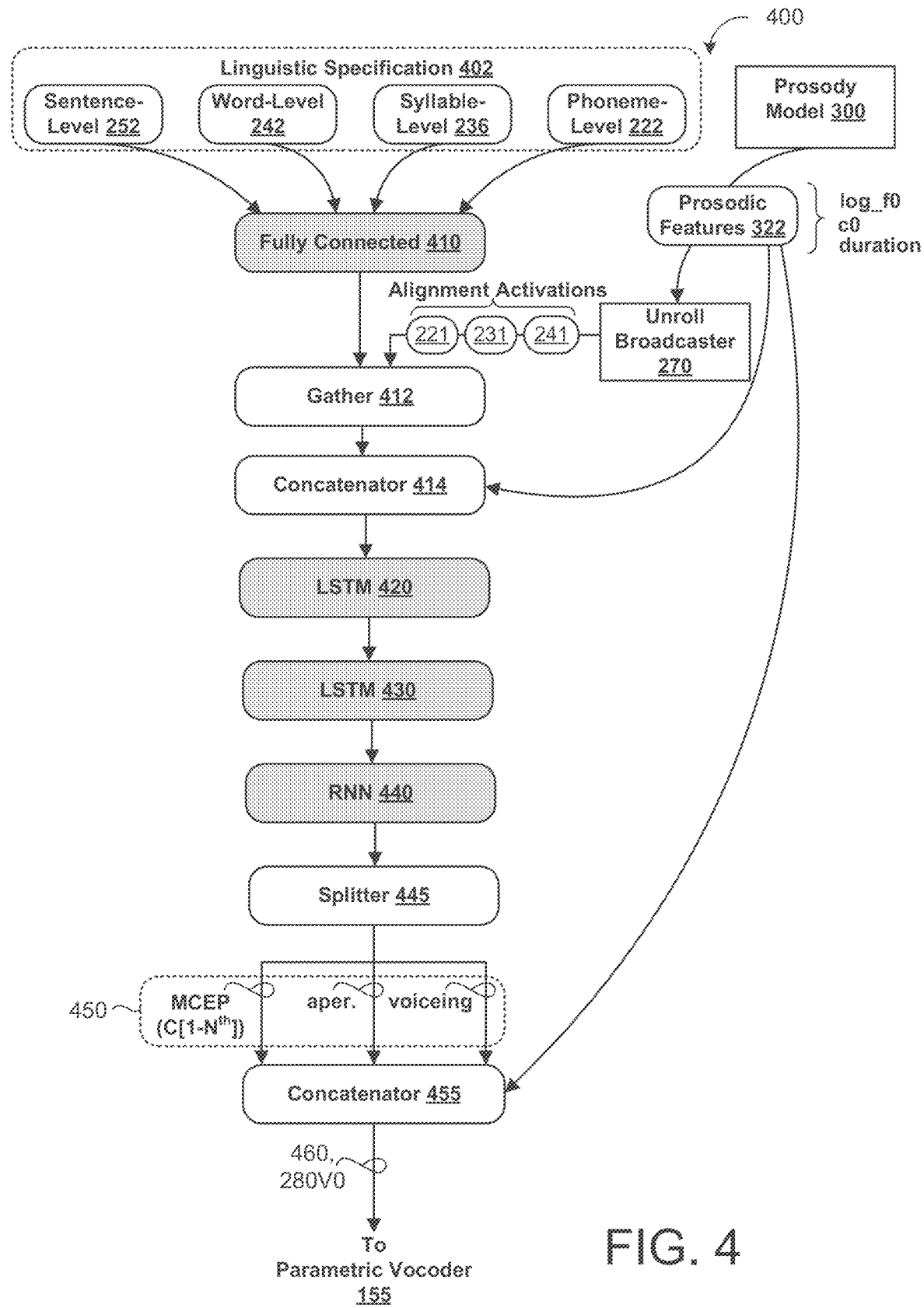
FIG. 4 is a schematic view of an example deep neural network for predicting vocoder parameters from prosodic features for driving a parametric vocoder.

FIG. 4 shows an example neural network vocoder model 400 that may be incorporated into the TTS system 150 of FIG. 1. The vocoder model 400 receives, as input, the prosodic features 322 output from the prosody model 300 that represent an intended prosody model for a text utterance 320, and a linguistic specification 402 for the text utterance 320. The prosodic features 322 output from the prosody model may include a duration, pitch contour f0_log, energy contour c0, and duration of each phoneme in the text utterance. The pitch contour f0_log may be represented by the sequence of fixed-length predicted pitch frames 280F0 of FIG. 3A and the energy contour c0 may be represented by the sequence of fixed-length predicted energy frames 280C0 of FIG. 3B. The linguistic specification 402 includes sentence-level linguistic features 252 for the text utterance 320, word-level linguistic features 242 for each word 240 of the text utterance 320, syllable-level linguistic features 236 for each syllable 230 of the text utterance 230, and phoneme-level linguistic features 222 for each phoneme 220 of the text utterance 320. In the example shown, a fully connected layer 410 receives the linguistic specification 402 and generates a fully-connected output input to a gatherer 412. The linguistic specification 402 may be normalized prior to input to the fully connected layer 410. Simultaneously, the unroll broadcaster 270 receives the prosodic features 322 output from the prosody model 300, and generates and provides linguistic feature alignment activations 221, 231, 241 for the linguistic specification 402 to the gatherer 412. At the gatherer, the word-level alignment activations 241 each align an activation 245 (FIG. 2) of each word 240 (FIG. 2) with syllable-level linguistic features 236 (FIG. 2) for each syllable 230 (FIG. 2) of the word 240, the syllable-level alignment activations 231 each align an activation 235 (FIG.

2) of each syllable with phoneme-level linguistic features 222 (FIG. 2) for each phoneme 220 (FIG. 2) of the syllable, and the phoneme-level alignment activations 221 each align an activation 225 (FIG. 2) of each phoneme 220 with corresponding fixed-length frames 280 (FIG. 2) of the phoneme 220.

An output from the gatherer 412 conveying the linguistic feature alignment activations 221, 231, 241 for the linguistic specification 402 is input to a concatenator 414 for concatenation with the prosodic features 322 output from the prosody model. The prosodic features 322 may be normalized prior to concatenation with the output from the gatherer 412 at the concatenator 414. The concatenated output from the concatenator 414 is input to a first LSTM layer 420 of the vocoder model 400 and an output of the first LSTM layer 420 is input to a second LSTM layer 430 of the vocoder model 400. Thereafter, an output of the second LSTM layer 430 is input to a recurrent neural network (RNN) layer 440 of the vocoder model 400 and a splitter 445 splits an output of the RNN layer 440 into the predicted additional vocoder parameters 450. As described above with reference to FIG. 1, the additional vocoder parameters 450 split by the splitter 445 include MCEPs ($c[1-n^{th}]$), aperiodicity components, and voicing components for each speech unit, e.g., fixed-length speech frame 280V0. The neural network vocoder model 400 is configured to predict a plurality of fixed-length speech frames 280V0 (e.g., 5 ms frames) that each represent a respective portion of the predicted vocoder parameters 450. Together, the prosodic features 322 predicted by the prosody model 300 and the additional vocoder parameters 450 provide all the vocoder parameters required to drive the parametric vocoder 155 to produce the synthesized speech representation 152 of the text utterance 320 with the intended prosody. Accordingly, after splitting the additional vocoder parameters 450, the vocoder model 400 inserts the prosodic features 322 of pitch f0 and energy c0 into an appropriate speech unit to allow a concatenator 455 to concatenate the prosodic features 322 and the additional vocoder parameters 450 into a final vocoder vector 460 for each of the plurality of fixed-length speech frames 280V0 to drive the parametric vocoder 155. Prior to concatenation, the additional vocoder parameters 450 may be denormalized.

Figure 5:
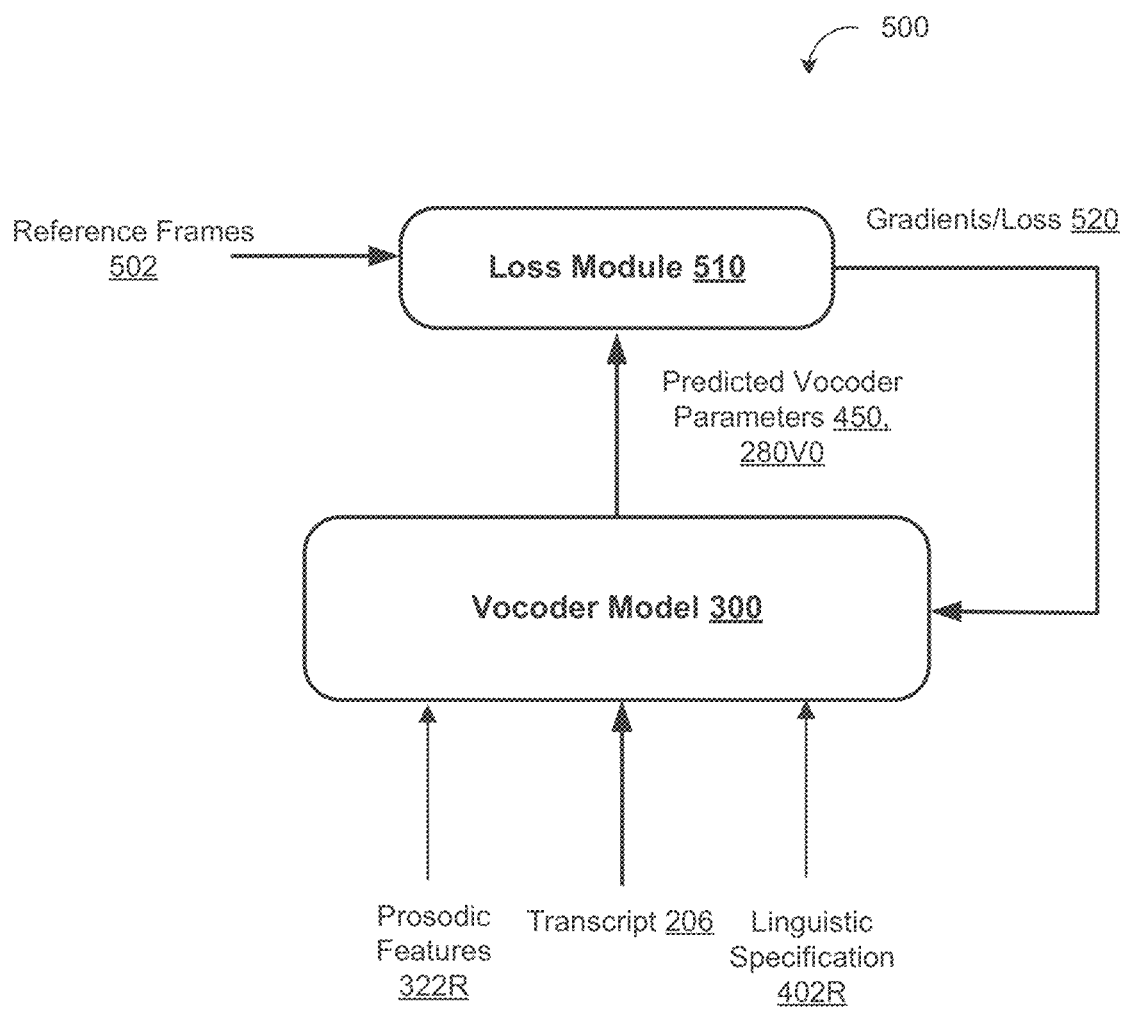
FIG. 5 is a schematic view of updating parameters of a vocoder model.

FIG. 5 is an example process 500 for training the vocoder model 400. The process 500 may be described with reference to FIGS. 1 and 5. As an example, the vocoder model 400 may be trained to learn to predict the additional vocoder parameters 450 (e.g., MCEPs ($c[1-n^{th}]$), aperiodicity components, and voicing components) for a piece of input text (e.g., reference transcript 206 of a reference audio signal 202) using, as input, reference prosodic features 322R (e.g., pitch F0, energy C0, and phoneme duration) and a reference linguistic specification 402R. The vocoder parameters 450 may be represented as the sequence of fixed-length predicted speech frames 280V0 each providing MCEPs, aperiodicity components, and voice components for a respective portion of the transcript 206.

The process 500 executes a loss module 510 configured to generate gradients/losses 520 between the predicted additional vocoder parameters 450 output by the vocoder model 400 and reference speech frames 502 sampled from the reference audio signal 202 (e.g., utterance) associated with the transcript 206. The reference speech frames 502 sampled from the reference audio signal 202 may include fixed-length reference speech frames (e.g., 5 ms) each providing reference (e.g., ground-truth) vocoder parameters sampled from a respective portion of the reference audio signal. Accordingly, the loss module 510 may generate gradients/losses between the sequence of fixed-length predicted speech frames 280V0 (representing the predicted additional vocoder parameters 450) generated by the vocoder model 400 and the sequence of fixed-length reference speech frames 502 (representing reference/ground-truth vocoder parameters 450) sampled from the corresponding reference audio signal 202. Here, the gradients/losses 520 may back-propagate through the vocoder model 400 to update parameters until the vocoder model 400 is fully trained.

Figure 6:
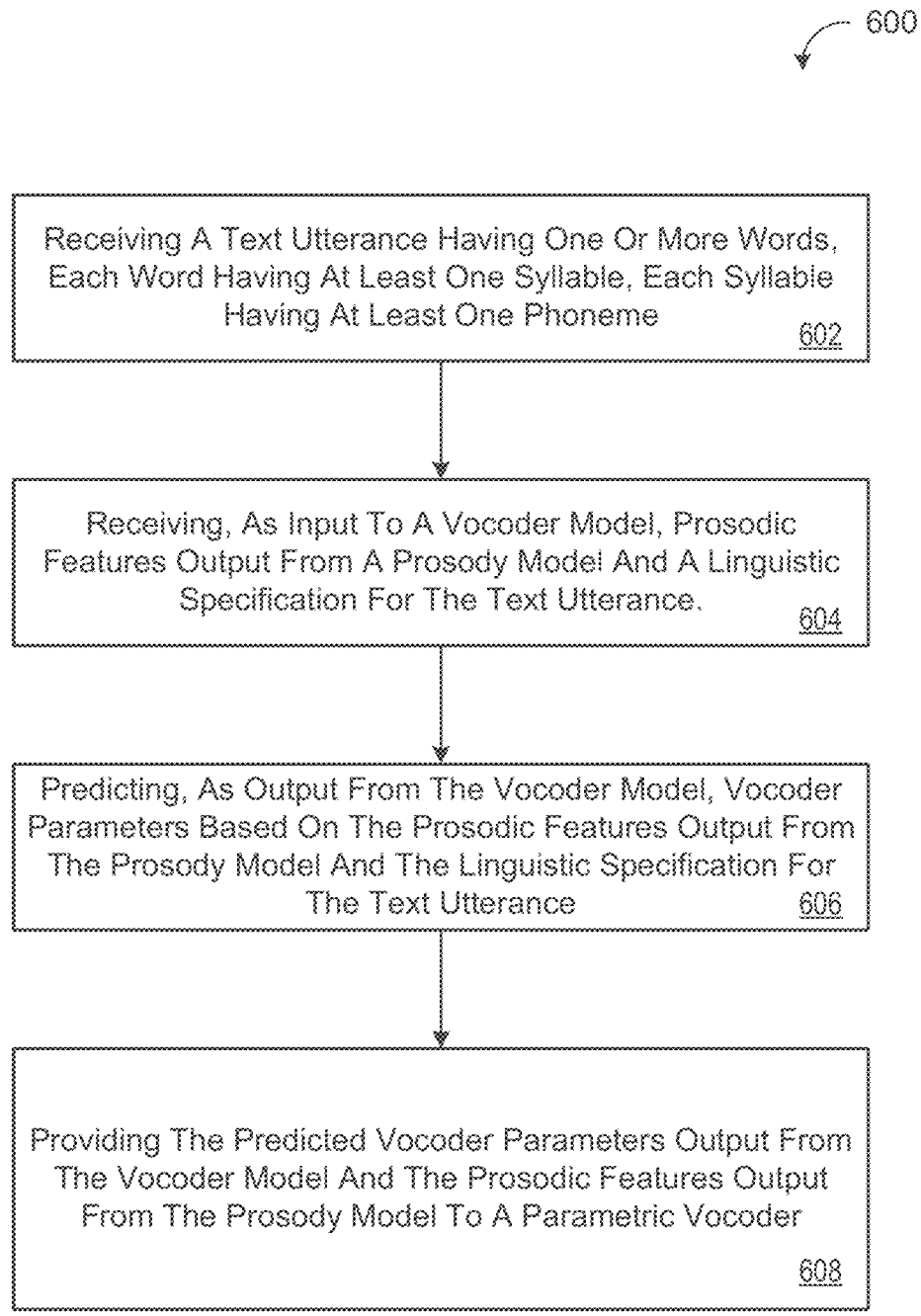
FIG. 6 is a flowchart of an example arrangement of operations for predicting vocoder parameters for a text utterance based on prosodic features output from a prosody model and a linguistic specification of the text utterance.

FIG. 6 is a flowchart of an example arrangement of operations for a method 600 of using prosodic features 322 to predict additional vocoder parameters 322 for a text utterance 320. The additional vocoder parameters 322 and the prosodic features 322 constitute all required vocoder parameters for driving a parametric vocoder 155 to produce a synthesized speech representation 152 of the text utterance 320 and having an intended prosody conveyed by the prosodic features 322. The method 600 may be described with reference to FIGS. 1-4. The memory hardware 114 residing on the user device 110 may store instructions that cause the data processing hardware 112 residing on the user device 110 to perform the example arrangement of operations for the method 600. At operation 602, the method 600 includes receiving the text utterance 320. The text utterance 320 has at least one word, each word having at least one syllable, each syllable having at least one phoneme.

At operation 604, the method 600 includes receiving, as input to the vocoder model 400, the prosodic features 322 output from the prosody model 300 and the linguistic specification 402 for the text utterance 320. The prosodic features 322 represent the intended prosody for the text utterance 320 and include a duration, pitch contour, and energy contour for the text utterance 320. The linguistic specification 402 includes sentence-level linguistic features 252 for the text utterance 320, word-level linguistic features 242 for each word 240 of the text utterance 320, syllable-level linguistic features 236 for each syllable 230 of the text utterance 320, and phoneme-level linguistic features 222 for each phoneme 220 of the text utterance 320.

At operation 606, the method 600 includes predicting, as output from the vocoder model 400, the (additional) vocoder parameters 450 based on the prosodic features 322 and the linguistic specification 402. At operation 608, the method 600 includes providing the predicted vocoder parameters 450 output from the vocoder model 400 and the prosodic features 322 output from the prosody model 300 to the parametric vocoder 155. The parametric vocoder 155 is configured to generate the synthesized speech representation 152 of the text utterance 320 having the intended prosody. Stated differently, the additional vocoder parameters 450 and the prosodic features 322 are configured to drive the parametric vocoder 155 to generate the synthesized speech representation 152. As described with reference to the vocoder model 400 of FIG. 4, the prosodic features 322 output from the prosody model 300 and the additional vocoder parameters 450 may be concatenated into a vocoder vector 460 for each speech unit (e.g., each of the plurality of fixed-length speech frames 280V0) to drive the parametric vocoder 155.

A text-to-speech (TTS) system 150 may incorporate the prosody model 300, the vocoder model 400, and the parametric vocoder 155. The TTS system 150 may reside on the user device 110, i.e., by executing on the data processing hardware 112 of the user device. In some configurations, the TTS system 150 resides on the computing system (e.g., server) 120, i.e., by executing on the data processing hardware 122. In some examples, some portions of the TTS system 150 execute on the computing system 120 and the remaining portions of the TTS system 150 execute on the user device 110. For instance, at least one of the prosody model 300 or the vocoder model 400 may execute on the computing system 120 while the parametric vocoder 155 may on the user device.

Figure 7:
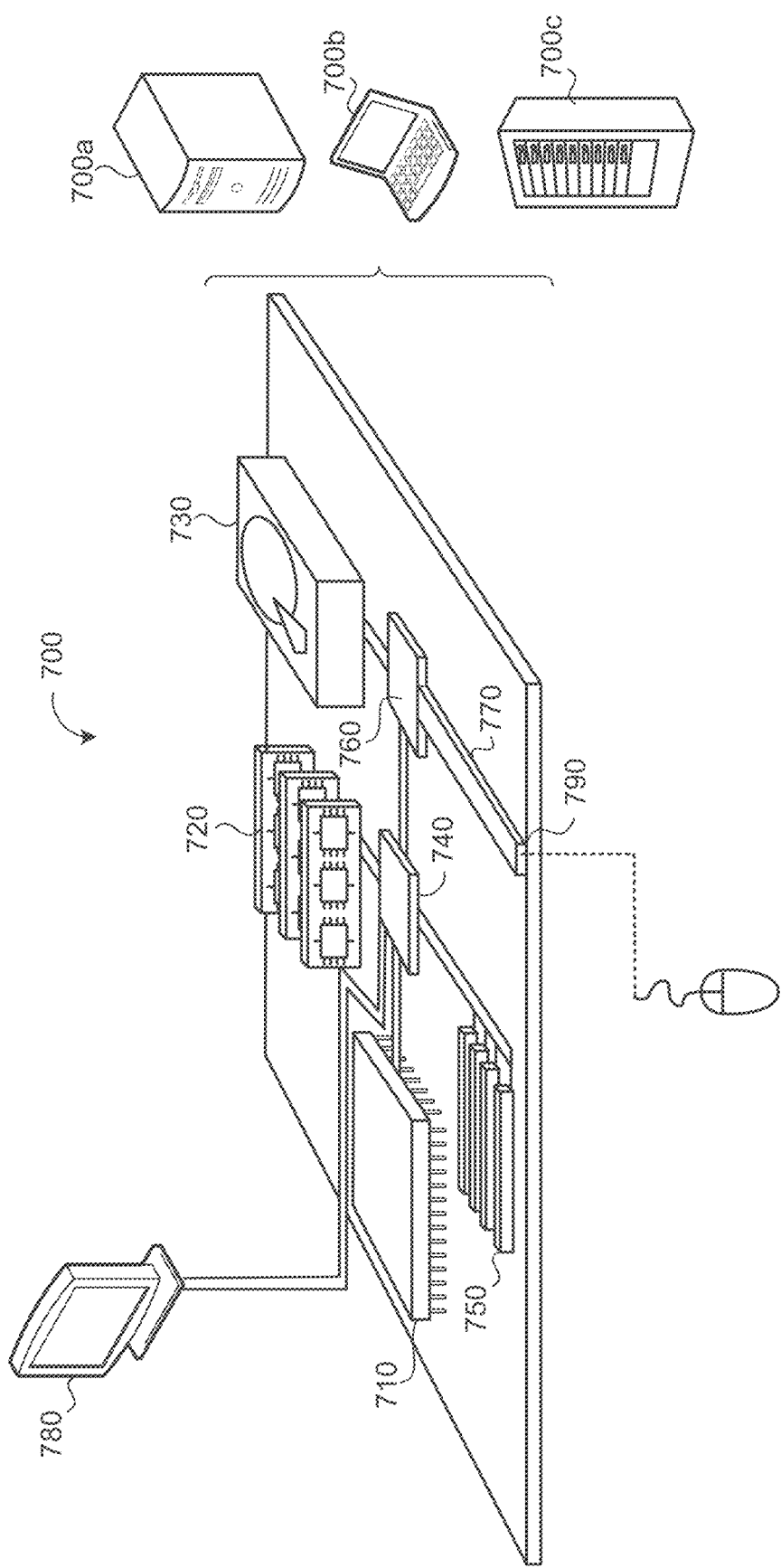
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g, internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a text utterance having one or more words, each word having one or more syllables, each syllable having one or more phonemes;
   receiving, at the data processing hardware, as input to a vocoder model:
      prosodic features output from a prosody model that represent an intended prosody for the text utterance, the prosodic features comprising a duration, pitch contour, and energy contour for the text utterance; and
      a linguistic specification of the text utterance, the linguistic specification comprising sentence-level linguistic features for the text utterance, word-level linguistic features for each word of the text utterance, syllable-level linguistic features for each syllable of the text utterance, and phoneme-level linguistic features for each phoneme of the text utterance;
   predicting, by the data processing hardware, as output from the vocoder model, vocoder parameters based on the prosodic features output from the prosody model and the linguistic specification of the text utterance; and
   providing, by the data processing hardware, the predicted vocoder parameters output from the vocoder model and the prosodic features output from the prosody model to a parametric vocoder, the parametric vocoder configured to generate a synthesized speech representation of the text utterance and having the intended prosody,
   wherein the vocoder model incorporates a hierarchical linguistic structure to represent the text utterance, the hierarchical linguistic structure comprising:
      a first level including a long short-term memory (LSTM) processing cell representing each word of the text utterance;
      a second level including a LSTM processing cell representing each syllable of the text utterance, the LSTM processing cells of the second level clocking relative to and faster than the LSTM processing cells of the first level;
      a third level including a LSTM processing cell representing each phoneme of the text utterance, the LSTM processing cells of the third level clocking relative to and faster than the LSTM processing cells of the second level; and
      a fourth level including a LSTM processing cell representing each of a plurality of fixed-length speech frames, the LSTM processing cells of the fourth level clocking relative to and faster than the LSTM processing cells of the third level.

2. The method of claim 1, further comprising:
   receiving, at the data processing hardware, as input to the vocoder model, linguistic feature alignment activations for the linguistic specification of the text utterance,
   wherein predicting the vocoder parameters is further based on the linguistic feature alignment activations for the linguistic specification of the text utterance.

3. The method of claim 2, wherein the linguistic feature alignment activations comprise:
   word-level alignment activations each aligning an activation of each word with the syllable-level linguistic features for each syllable of the word; and
   syllable-level alignment activations each aligning an activation of each syllable with the phoneme-level linguistic features for each phoneme of the syllable.

4. The method of claim 3, wherein the activation of each word is based on the word-level linguistic features for the corresponding word and the sentence-level linguistic features for the text utterance.

5. The method of claim 1, wherein the word-level linguistic features comprise a wordpiece embedding obtained from a sequence of wordpiece embeddings generated by a Bidirectional Encoder Representations from Transformers (BERT) model from the text utterance.

6. The method of claim 1, further comprising:
   selecting, by the data processing hardware, an utterance embedding for the text utterance, the utterance embedding representing the intended prosody;
   for each syllable, using the selected utterance embedding:
      predicting, by the data processing hardware, using the prosody model, a duration of the syllable by encoding the phoneme-level linguistic features of each phoneme in the syllable with a corresponding prosodic syllable embedding for the syllable;
      predicting, by the data processing hardware, a pitch of the syllable based on the predicted duration for the syllable; and
      generating, by the data processing hardware, a plurality of fixed-length predicted pitch frames based on the predicted duration for the syllable, each fixed-length pitch frame representing the predicted pitch of the syllable, wherein the prosodic features received as input to the vocoder model comprise the plurality of fixed-length predicted pitch frames generated for each syllable of the text utterance.

7. The method of claim 6, further comprising, for each syllable, using the selected utterance embedding:
predicting, by the data processing hardware, an energy level of each phoneme in the syllable based on the predicted duration for the syllable; and
for each phoneme in the syllable, generating, by the data processing hardware, a plurality of fixed-length predicted energy frames based on the predicted duration for the syllable, each fixed-length predicted energy frame representing the predicted energy level of the corresponding phoneme,
wherein the prosodic features received as input to the vocoder model further comprise the plurality of fixed-length predicted energy frames generated for each phoneme in each syllable of the text utterance.

8. The method of claim 7, wherein the prosody model incorporates a hierarchical linguistic structure to represent the text utterance, the hierarchical linguistic structure comprising:
a first level including a long short-term memory (LSTM) processing cell representing each word of the text utterance;
a second level including a LSTM processing cell representing each syllable of the text utterance, the LSTM processing cells of the second level clocking relative to and faster than the LSTM processing cells of the first level;
a third level including a LSTM processing cell representing each phoneme of the text utterance, the LSTM processing cells of the third level clocking relative to and faster than the LSTM processing cells of the second level;
a fourth level including a LSTM processing cell representing each fixed-length predicted pitch frame, the LSTM processing cells of the fourth level clocking relative to and faster than the LSTM processing cells of the third level; and
a fifth level including a LSTM processing cell representing each fixed-length predicted energy frame, the LSTM processing cells of the fifth level clocking at the same speed as the LSTM processing cells of the fourth level and clocking relative to and faster than the LSTM processing cells of the third level.

9. The method of claim 8, wherein:
the first level of the hierarchical linguistic structure generates an activation for each word of the text utterance in a single first pass;
the second level of the hierarchical linguistic structure generates an activation for each syllable of the text utterance in a single second pass subsequent to the first pass;
the third level of the hierarchical linguistic structure generates an activation for each phoneme of the text utterance in a single third pass subsequent to the second pass;
the fourth level of the hierarchical linguistic structure generates an activation for each fixed-length predicted pitch frame in a single fourth pass subsequent to the third pass; and
the fifth level of the hierarchical linguistic structure generates an activation for each fixed-length predicted energy frame in a single fifth pass subsequent to the third pass.

10. The method of claim 1, wherein each of the plurality of fixed-length speech frames represent a respective portion of the predicted vocoder parameters output from the vocoder model.

11. The method of claim 1, wherein:
the first level of the hierarchical linguistic structure generates an activation for each word of the text utterance in a single first pass;
the second level of the hierarchical linguistic structure generates an activation for each syllable of the text utterance in a single second pass subsequent to the first pass;
the third level of the hierarchical linguistic structure generates an activation for each phoneme of the text utterance in a single third pass subsequent to the second pass; and
the fourth level of the hierarchical linguistic structure generates an activation for each fixed-length speech frame of the plurality of fixed-length speech frames in a single fourth pass subsequent to the third pass.

12. The method of claim 1, further comprising:
receiving, at the data processing hardware, training data including a plurality of reference audio signals and corresponding transcripts, each reference audio signal comprising a spoken utterance of speech and having a corresponding prosody, each transcript comprising a textual representation of the corresponding reference audio signal; and
for each reference audio signal and corresponding transcript pair:
obtaining, by the data processing hardware, a reference linguistic specification of the corresponding transcript and reference prosodic features representing the corresponding prosody of the corresponding reference audio signal; and
training, by the data processing hardware, using a deep neural network, the vocoder model to generate, from the reference linguistic specification and the reference prosodic features, a sequence of fixed-length predicted speech frames providing Mel-cepstrum coefficients, aperiodicity components, and voicing components.

13. The method of claim 12, wherein training the vocoder model further comprises, for each reference audio signal:
sampling, from the corresponding reference audio signal, a sequence of fixed-length reference speech frames providing reference Mel-cepstrum coefficients, reference aperiodicity components, and reference voicing components of the reference audio signal;
generating gradients/losses between the sequence of fixed-length predicted speech frames generated by the vocoder model and the sequence of fixed-length reference speech frames sampled from the corresponding reference audio signal; and
back-propagating the gradients/losses through the vocoder model.

14. The method of claim 1, further comprising:
splitting, by the data processing hardware, the predicted vocoder parameters output from the vocoder model into Mel-cepstrum coefficients, aperiodicity components, and voicing components;
separately denormalizing, by the data processing hardware, the Mel-cepstrum coefficients, aperiodicity components, and voicing components; and
concatenating, by the data processing hardware, the prosodic features output from the prosody model, the denormalized Mel-cepstrum coefficients, the denormalized aperiodicity components, and the denormalized voicing components into a vocoder vector, wherein providing the predicted vocoder parameters output from the vocoder model and the prosodic features output from the prosody model to the parametric vocoder comprises providing the vocoder vector to the parametric vocoder as input for generating the synthesized speech representation of the text utterance.

15. A system comprising:

data processing hardware; and memory hardware in communication with the data processing hardware, the memory hardware storing instructions that when executed on the data processing hardware cause the data processing hardware to perform operations comprising:

receiving a text utterance having one or more words, each word having one or more syllables, each syllable having one or more phonemes;

receiving as input to a vocoder model:

prosodic features output from a prosody model that represent an intended prosody for the text utterance, the prosodic features comprising a duration, pitch contour, and energy contour for the text utterance; and a linguistic specification of the text utterance, the linguistic specification comprising sentence-level linguistic features for the text utterance, word-level linguistic features for each word of the text utterance, syllable-level linguistic features for each syllable of the text utterance, and phoneme-level linguistic features for each phoneme of the text utterance;

predicting as output form the vocoder model, vocoder parameters based on the prosodic features output form the prosody model and the linguistic specification of the text utterance; and providing the predicted vocoder parameters output form the vocoder model and the prosodic features output form the prosody model to a parametric vocoder, the parametric vocoder configured to generate a synthesized speech representation of the text utterance and having the intended prosody, wherein the vocoder model incorporates a hierarchical linguistic structure to represent the text utterance, the hierarchical linguistic structure comprising:

a first level including a long short-term memory (LSTM) processing cell representing each word of the text utterance;

a second level including a LSTM processing cell representing each syllable of the text utterance, the LSTM processing cells of the second level clocking relative to and faster than the LSTM processing cells of the first level;

a third level including a LSTM processing cell representing each phoneme of the text utterance, the LSTM processing cells of the third level clocking relative to and faster than the LSTM processing cells of the second level; and a fourth level including a LSTM processing cell representing each of a plurality of fixed-length speech frames, the LSTM processing cells of the fourth level clocking relative to and faster than the LSTM processing cells of the third level.

16. The system of claim 15, wherein the operations further comprise:

receiving as input to the vocoder model, linguistic feature alignment activations for the linguistic specification of the text utterance, wherein predicting the vocoder parameters is further based on the linguistic feature alignment activations for the linguistic specification of the text utterance.

17. The system of claim 16, wherein the linguistic feature alignment activations comprise:

word-level alignment activations each aligning an activation of each word with the syllable-level linguistic features for each syllable of the word; and syllable-level alignment activations each aligning an activation of each syllable with the phoneme-level linguistic features for each phoneme of the syllable.

18. The system of claim 17, wherein the activation of each word is based on the word-level linguistic features for the corresponding word and the sentence-level linguistic features for the text utterance.

19. The system of claim 15, wherein the word-level linguistic features comprise a wordpiece embedding obtained from a sequence of wordpiece embeddings generated by a Bidirectional Encoder Representations form Transformers (BERT) model from the text utterance.

20. The system of claim 15, wherein the operations further comprise:

selecting an utterance embedding for the text utterance, the utterance embedding representing the intended prosody;

for each syllable, using the selected utterance embedding:

predicting using the prosody model, a duration of the syllable by encoding the phoneme-level linguistic features of each phoneme in the syllable with a corresponding prosodic syllable embedding for the syllable;

predicting a pitch of the syllable based on the predicted duration for the syllable; and generating a plurality of fixed-length predicted pitch frames based on the predicted duration for the syllable, each fixed-length pitch frame representing the predicted pitch of the syllable, wherein the prosodic features received as input to the vocoder model comprise the plurality of fixed-length predicted pitch frames generated for each syllable of the text utterance.

21. The system of claim 20, wherein the operations further comprise, for each syllable, using the selected utterance embedding:

predicting an energy level of each phoneme in the syllable based on the predicted duration for the syllable; and for each phoneme in the syllable, generating a plurality of fixed-length predicted energy frames based on the predicted duration for the syllable, each fixed-length predicted energy frame representing the predicted energy level of the corresponding phoneme, wherein the prosodic features received as input to the vocoder model further comprise the plurality of fixed-length predicted energy frames generated for each phoneme in each syllable of the text utterance.

22. The system of claim 21, wherein the prosody model incorporates a hierarchical linguistic structure to represent the text utterance, the hierarchical linguistic structure comprising:

a first level including a long short-term memory (LSTM) processing cell representing each word of the text utterance;

a second level including a LSTM processing cell representing each syllable of the text utterance, the LSTM processing cells of the second level clocking relative to and faster than the LSTM processing cells of the first level;

a third level including a LSTM processing cell representing each phoneme of the text utterance, the LSTM processing cells of the third level clocking relative to and faster than the LSTM processing cells of the second level;

a fourth level including a LSTM processing cell representing each fixed-length predicted pitch frame, the LSTM processing cells of the fourth level clocking relative to and faster than the LSTM processing cells of the third level; and a fifth level including a LSTM processing cell representing each fixed-length predicted energy frame, the LSTM processing cells of the fifth level clocking at the same speed as the LSTM processing cells of the fourth level and clocking relative to and faster than the LSTM processing cells of the third level.

23. The system of claim 22, wherein:

the first level of the hierarchical linguistic structure generates an activation for each word of the text utterance in a single first pass;

the second level of the hierarchical linguistic structure generates an activation for each syllable of the text utterance in a single second pass subsequent to the first pass;

the third level of the hierarchical linguistic structure generates an activation for each phoneme of the text utterance in a single third pass subsequent to the second pass;

the fourth level of the hierarchical linguistic structure generates an activation for each fixed-length predicted pitch frame in a single fourth pass subsequent to the third pass; and the fifth level of the hierarchical linguistic structure generates an activation for each fixed-length predicted energy frame in a single fifth pass subsequent to the third pass.

24. The system of claim 15, wherein each of the plurality of fixed-length speech frames represent a respective portion of the predicted vocoder parameters output from the vocoder model.

25. The system of claim 15, wherein:

the first level of the hierarchical linguistic structure generates an activation for each word of the text utterance in a single first pass;

the second level of the hierarchical linguistic structure generates an activation for each syllable of the text utterance in a single second pass subsequent to the first pass;

the third level of the hierarchical linguistic structure generates an activation for each phoneme of the text utterance in a single third pass subsequent to the second pass; and the fourth level of the hierarchical linguistic structure generates an activation for each fixed-length speech frame of the plurality of fixed-length speech frames in a single fourth pass subsequent to the third pass.

26. The system of claim 15, wherein the operations further comprise:

receiving training data including a plurality of reference audio signals and corresponding transcripts, each reference audio signal comprising a spoken utterance of speech and having a corresponding prosody, each transcript comprising a textual representation of the corresponding reference audio signal; and for each reference audio signal and corresponding transcript pair:

obtaining a reference linguistic specification of the corresponding transcript and reference prosodic features representing the corresponding prosody of the corresponding reference audio signal; and training using a deep neural network, the vocoder model to generate, from the reference linguistic specification and the reference prosodic features, a sequence of fixed-length predicted speech frames providing Mel-cepstrum coefficients, aperiodicity components, and voicing components.

27. The method of claim 26, wherein training the vocoder model further comprises, for each reference audio signal:

sampling, from the corresponding reference audio signal, a sequence of fixed-length reference speech frames providing reference Mel-cepstrum coefficients, reference aperiodicity components, and reference voicing components of the reference audio signal;

generating gradients/losses between the sequence of fixed-length predicted speech frames generated by the vocoder model and the sequence of fixed-length reference speech frames sampled from the corresponding reference audio signal; and back-propagating the gradients/losses through the vocoder model.

28. The system of claim 15, wherein the operations further comprise:

splitting the predicted vocoder parameters output from the vocoder model into Mel-cepstrum coefficients, aperiodicity components, and voicing components;

separately denormalizing the Mel-cepstrum coefficients, aperiodicity components, and voicing components; and concatenating the prosodic features output from the prosody model, the denormalized Mel-cepstrum coefficients, the denormalized aperiodicity components, and the denormalized voicing components into a vocoder vector, wherein providing the predicted vocoder parameters output from the vocoder model and the prosodic features output from the prosody model to the parametric vocoder comprises providing the vocoder vector to the parametric vocoder as input for generating the synthesized speech representation of the text utterance.

* * * * *